US009253653B2

(12) United States Patent
Gogic

(10) Patent No.: US 9,253,653 B2
(45) Date of Patent: Feb. 2, 2016

(54) ACCESS POINT CONFIGURATION BASED ON RECEIVED ACCESS POINT SIGNALS

(75) Inventor: Aleksandar M. Gogic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 929 days.

(21) Appl. No.: 12/265,565

(22) Filed: Nov. 5, 2008

(65) Prior Publication Data
US 2009/0122773 A1 May 14, 2009

Related U.S. Application Data

(60) Provisional application No. 60/986,992, filed on Nov. 9, 2007, provisional application No. 60/986,925, filed on Nov. 9, 2007.

(51) Int. Cl.
*H04W 88/08* (2009.01)
*H04W 24/02* (2009.01)
*H04W 56/00* (2009.01)
*H04W 84/04* (2009.01)
*H04W 92/20* (2009.01)

(52) U.S. Cl.
CPC ............ *H04W 24/02* (2013.01); *H04W 56/001* (2013.01); *H04W 84/045* (2013.01); *H04W 92/20* (2013.01)

(58) Field of Classification Search
CPC .............. H04W 24/02; H04W 84/045; H04W 72/0413; H04W 64/00; H04L 63/10
See application file for complete search history.

(56) References Cited

U.S. PATENT DOCUMENTS

| 4,707,841 | A | 11/1987 | Yen et al. |
| 5,093,926 | A | 3/1992 | Sasuta |
| 5,640,677 | A | 6/1997 | Karlsson |
| 5,896,573 | A | 4/1999 | Yang et al. |
| 5,983,097 | A | 11/1999 | Kakinuma et al. |
| 6,031,829 | A | 2/2000 | Dupuy et al. |
| 6,167,268 | A | 12/2000 | Souissi et al. |
| 6,529,491 | B1 | 3/2003 | Chang et al. |

(Continued)

FOREIGN PATENT DOCUMENTS

| CN | 1129509 A | 8/1996 |
| CN | 1207859 A | 2/1999 |

(Continued)

OTHER PUBLICATIONS

Dimitri Rubin and Todd Young: "Femtocells Bridging Reliable Location and Timing Indoors" Insidegnss, vol. 3, No. 7, 2008, pp. 40-46, XP002520000 the whole document.
International Search Report & Written Opinion—PCT/US2008/082607, International Search Authority—European Patent Office—Aug. 14, 2009.
Bender, P., et al., "CDMA/HDR: A Bandwidth-Efficient High-speed Wireless Data Service for Nomadic Users" IEEE Communications Magazine, IEEE Service Center, Piscataway, US, vol. 38, No. 7, Jul. 1, 2000, pp. 70-77, XP010091318.

(Continued)

*Primary Examiner* — Chirag Shah
*Assistant Examiner* — Srinivasa Reddivalam
(74) *Attorney, Agent, or Firm* — Linda G. Gunderson

(57) ABSTRACT

An access point is configured based on signals received from one or more access points on a forward link. Such an access point may comprise, for example, a relatively small coverage area access point and/or an access point that is deployed in an ad-hoc manner. In some aspects, an access point may determine its location based on signals received from several neighboring macro access points. In some aspects, the timing of an access point may be synchronized to timing indicated by signals that are received from one or more neighboring access points.

29 Claims, 15 Drawing Sheets

(56) References Cited

U.S. PATENT DOCUMENTS

| | | |
|---|---|---|
| 6,539,491 B1 | 3/2003 | Skergan et al. |
| 6,590,881 B1 | 7/2003 | Wallace et al. |
| 6,621,811 B1 | 9/2003 | Chang et al. |
| 6,956,527 B2 | 10/2005 | Rogers et al. |
| 6,983,156 B2 | 1/2006 | Fukushima et al. |
| 6,999,778 B2 | 2/2006 | DiBuduo |
| 7,020,111 B2 | 3/2006 | Ozluturk et al. |
| 7,054,627 B1 | 5/2006 | Hillman |
| 7,254,407 B1 | 8/2007 | Bokish |
| 7,263,370 B1 | 8/2007 | Infosino |
| 7,289,541 B2 | 10/2007 | Elam |
| 7,319,878 B2 | 1/2008 | Sheynblat et al. |
| 7,340,278 B2 | 3/2008 | Nakada |
| 7,346,321 B2 | 3/2008 | Backes |
| 7,395,074 B2 | 7/2008 | Syrjarinne |
| 7,433,694 B2 | 10/2008 | Morgan et al. |
| 7,477,920 B2 | 1/2009 | Scheinert et al. |
| 7,715,471 B2 | 5/2010 | Werner et al. |
| 7,840,985 B2 | 11/2010 | MacInnis |
| 8,045,638 B2 | 10/2011 | Grant et al. |
| 8,169,982 B2 | 5/2012 | Gogic et al. |
| 2002/0082044 A1 | 6/2002 | Davenport |
| 2003/0008669 A1* | 1/2003 | Stein et al. .................... 455/456 |
| 2003/0022686 A1 | 1/2003 | Soomro et al. |
| 2003/0048758 A1 | 3/2003 | Jones et al. |
| 2003/0118015 A1 | 6/2003 | Gunnarsson et al. |
| 2003/0144006 A1 | 7/2003 | Johansson et al. |
| 2003/0214937 A1 | 11/2003 | Lindoff et al. |
| 2003/0234741 A1* | 12/2003 | Rogers et al. ................ 342/463 |
| 2004/0071119 A1 | 4/2004 | Ishikawa et al. |
| 2004/0109475 A1 | 6/2004 | Elam |
| 2004/0147232 A1 | 7/2004 | Zodnik |
| 2004/0162084 A1 | 8/2004 | Wang |
| 2004/0166886 A1 | 8/2004 | Laroia et al. |
| 2005/0009521 A1 | 1/2005 | Preece |
| 2005/0018597 A1 | 1/2005 | Yuda et al. |
| 2005/0037775 A1 | 2/2005 | Moeglein et al. |
| 2005/0078033 A1 | 4/2005 | Tamaki et al. |
| 2005/0148368 A1 | 7/2005 | Scheinert et al. |
| 2005/0227689 A1 | 10/2005 | Jewett |
| 2005/0246334 A1 | 11/2005 | Tao et al. |
| 2005/0250496 A1 | 11/2005 | Hason et al. |
| 2005/0255890 A1* | 11/2005 | Nakada ........................ 455/561 |
| 2005/0272444 A1 | 12/2005 | Heffield et al. |
| 2006/0016850 A1 | 1/2006 | Yoshie |
| 2006/0045134 A1 | 3/2006 | Eldon et al. |
| 2006/0052067 A1 | 3/2006 | Singh et al. |
| 2006/0148486 A1 | 7/2006 | Kim et al. |
| 2006/0234739 A1 | 10/2006 | Thadasina et al. |
| 2007/0002813 A1 | 1/2007 | Tenny et al. |
| 2007/0004428 A1 | 1/2007 | Morgan et al. |
| 2007/0019586 A1 | 1/2007 | Nanda et al. |
| 2007/0030956 A1 | 2/2007 | Hornig |
| 2007/0053340 A1* | 3/2007 | Guilford ........................ 370/350 |
| 2007/0097938 A1 | 5/2007 | Nylander et al. |
| 2007/0097939 A1 | 5/2007 | Nylander et al. |
| 2007/0105527 A1 | 5/2007 | Nylander et al. |
| 2007/0121560 A1 | 5/2007 | Edge |
| 2007/0178914 A1 | 8/2007 | Montenegro |
| 2007/0184185 A1 | 8/2007 | Besinger et al. |
| 2007/0184845 A1 | 8/2007 | Troncoso |
| 2007/0238448 A1 | 10/2007 | Gallagher et al. |
| 2008/0153533 A1 | 6/2008 | Claussen et al. |
| 2009/0034501 A1 | 2/2009 | Hahm et al. |
| 2009/0061821 A1* | 3/2009 | Chen et al. .................... 455/411 |
| 2009/0092111 A1 | 4/2009 | Horn et al. |
| 2009/0098873 A1 | 4/2009 | Gogic |
| 2009/0098885 A1 | 4/2009 | Gogic et al. |
| 2009/0156165 A1* | 6/2009 | Raghothaman et al. ...... 455/411 |
| 2009/0163227 A1 | 6/2009 | Collins |
| 2009/0221287 A1 | 9/2009 | Balasubramanian et al. |
| 2010/0054206 A1 | 3/2010 | Kalhan |
| 2010/0056177 A1 | 3/2010 | Kojima |
| 2010/0069066 A1 | 3/2010 | Shen et al. |
| 2010/0120394 A1 | 5/2010 | Mia et al. |
| 2010/0130212 A1 | 5/2010 | So et al. |
| 2010/0178916 A1 | 7/2010 | Jamadagni |
| 2010/0240397 A1 | 9/2010 | Buchmayer et al. |
| 2010/0246529 A1 | 9/2010 | Ishizu et al. |
| 2010/0260052 A1 | 10/2010 | Cho et al. |
| 2010/0304741 A1 | 12/2010 | Gogic et al. |
| 2010/0329206 A1 | 12/2010 | Thome et al. |
| 2011/0105128 A1 | 5/2011 | Narasimha |
| 2011/0130115 A1 | 6/2011 | Venkatachalam |
| 2011/0134833 A1 | 6/2011 | Gogic |
| 2011/0170481 A1 | 7/2011 | Gomes et al. |
| 2011/0205932 A1 | 8/2011 | Ekici et al. |
| 2012/0015649 A1 | 1/2012 | Li et al. |
| 2012/0106349 A1 | 5/2012 | Adjakple et al. |
| 2012/0108199 A1 | 5/2012 | Wang et al. |
| 2012/0122492 A1 | 5/2012 | Zhou et al. |
| 2012/0142362 A1 | 6/2012 | Mori |
| 2012/0220310 A1 | 8/2012 | Gogic et al. |

FOREIGN PATENT DOCUMENTS

| | | |
|---|---|---|
| CN | 1215659 C | 8/2005 |
| CN | 1820521 A | 8/2006 |
| CN | 1894979 A | 1/2007 |
| CN | 101563947 A | 10/2009 |
| EP | 0865172 A2 | 9/1998 |
| EP | 0973271 A1 | 1/2000 |
| EP | 1037482 A2 | 9/2000 |
| EP | 1119137 A1 | 7/2001 |
| EP | 1298847 A1 | 4/2003 |
| EP | 1365613 A1 | 11/2003 |
| EP | 1739881 A1 | 1/2007 |
| EP | 1848125 | 10/2007 |
| EP | 2073163 A1 | 6/2009 |
| GB | 2313257 A | 11/1997 |
| GB | 2389005 | 11/2003 |
| GB | 2398970 | 9/2004 |
| GB | 2446847 A | 8/2008 |
| JP | 10221425 | 8/1998 |
| JP | 2003506960 A | 2/2003 |
| JP | 2003519995 T | 6/2003 |
| JP | 2004297121 A | 10/2004 |
| JP | 2004320473 A | 11/2004 |
| JP | 2004535575 T | 11/2004 |
| JP | 2005509136 A | 4/2005 |
| JP | 2005123662 A | 5/2005 |
| JP | 2006074468 A | 3/2006 |
| JP | 2006508603 A | 3/2006 |
| JP | 2006186551 A | 7/2006 |
| JP | 2007520146 A | 7/2007 |
| JP | 2009504018 A | 1/2009 |
| JP | 2009504019 A | 1/2009 |
| JP | 2009510973 A | 3/2009 |
| JP | 2010074779 A | 4/2010 |
| JP | 2010081118 A | 4/2010 |
| KR | 20080079946 A | 9/2008 |
| RU | 2113772 C1 | 6/1998 |
| RU | 2197780 C2 | 1/2003 |
| RU | 2296436 C2 | 3/2007 |
| RU | 2007134181 A | 3/2009 |
| RU | 2360378 C1 | 6/2009 |
| WO | WO9501706 A1 | 1/1995 |
| WO | 9919743 A | 4/1999 |
| WO | WO0075684 A1 | 12/2000 |
| WO | 0111804 A1 | 2/2001 |
| WO | WO0115340 A1 | 3/2001 |
| WO | 0239759 A2 | 5/2002 |
| WO | 02082832 | 10/2002 |
| WO | WO03001687 A2 | 1/2003 |
| WO | 03010552 A2 | 2/2003 |
| WO | WO03081939 A1 | 10/2003 |
| WO | WO03100647 A1 | 12/2003 |
| WO | WO03101138 A1 | 12/2003 |
| WO | 2004052041 A1 | 6/2004 |
| WO | WO2004051887 A2 | 6/2004 |
| WO | WO2004077753 A2 | 9/2004 |
| WO | WO-2005036836 A1 | 4/2005 |
| WO | WO2005039214 A1 | 4/2005 |
| WO | WO2005057834 A2 | 6/2005 |

(56) References Cited

FOREIGN PATENT DOCUMENTS

| | | |
|---|---|---|
| WO | WO-2005076656 A1 | 8/2005 |
| WO | WO2005088991 A1 | 9/2005 |
| WO | WO2007022005 A2 | 2/2007 |
| WO | 2007040449 A1 | 4/2007 |
| WO | WO2007040454 A2 | 4/2007 |
| WO | WO2007112559 A1 | 10/2007 |
| WO | WO2008030956 | 3/2008 |
| WO | 2008055251 | 5/2008 |
| WO | WO2008076222 | 6/2008 |
| WO | WO2008109842 | 9/2008 |
| WO | WO2008131588 | 11/2008 |
| WO | WO2008131591 | 11/2008 |
| WO | WO2008136416 | 11/2008 |
| WO | 2009108811 A1 | 9/2009 |
| WO | 2009116427 A1 | 9/2009 |
| WO | WO2009120902 A1 | 10/2009 |

OTHER PUBLICATIONS

EE624 Mobile Communications Systems (MCS) in: Spread Spectrum Systems, Communication Networks Research Lab, (Fall 2000).
Taiwan Search Report—TW097143233—TIPO—Mar. 14, 2012.
3GPP TS 25.133 V8.10.0 (Mar. 2010), 3rd Generation Partnership Project; Technical Specification Group Radio Access Network; Requirements for support of radio resource management (FDD) (Release 8), 236 pp.
Universal Mobile Telecommunications, System (UMTS); Radio Resource Control, (RRC); Protocol specification (3GPP TS 25.331 version 9.1.0 Release 9), Technical Specification, European Telecommunications Standards Institute (ETSI), 650, Route Des Lucioles; F-06921 Sophia-Antipolis; France, vol. 3GPP Ran 2, No. V9.1.0, Feb. 1, 2010, XP014046584, p. 461-467 p. 1684-1685, paragraph 14.7a page 1688, paragraph 14.11.1-page 1690, paragraph 14.11.2.

\* cited by examiner

ACCESS POINT CONFIGURATION BASED ON RECEIVED ACCESS POINT SIGNALS

CLAIM OF PRIORITY UNDER 35 U.S.C. §119

This application claims the benefit of and priority to commonly owned U.S. Provisional Patent Application No. 60/986,992, filed Nov. 9, 2007, and U.S. Provisional Patent Application No. 60/986,925, filed Nov. 9, 2007, the disclosure of each of which is hereby incorporated by reference herein.

BACKGROUND

1. Field

This application relates generally to wireless communication and more specifically, but not exclusively, to processing signals from one or more access points.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations, small-coverage base stations may be deployed (e.g., installed in a user's home) to provide more robust indoor wireless coverage to mobile units. Such small-coverage base stations are generally known as access point base stations, Home NodeBs, or femto cells. Typically, such small-coverage base stations are connected to the Internet and the mobile operator's network via a DSL router or a cable modem. In practice, these small-coverage base stations may be deployed in an ad-hoc manner. Consequently, there is a need for improved techniques for deploying such base stations.

SUMMARY

A summary of sample aspects of the disclosure follows. It should be understood that any reference to the term aspects herein may refer to one or more aspects of the disclosure.

The disclosure relates in some aspect to configuring an access point. In some aspects, the teachings herein may be used in conjunction with a relatively small coverage area access point. In some aspects, the teachings herein may be used in conjunction with ad-hoc deployment of an access point.

The disclosure relates in some aspect to determining the location of an access point. For example, an access point may determine its location based on forward link signals received from several neighboring macro access points.

The disclosure relates in some aspect to defining timing of an access point. For example, the timing of an access point may be synchronized to timing indicated by forward link signals that are received from another access point. In addition, provisions are made to account for a phase offset (delay) that may otherwise arise as a result of the distance between the access points.

BRIEF DESCRIPTION OF THE DRAWINGS

These and other sample aspects of the disclosure will be described in the detailed description and the appended claims that follow, and in the accompanying drawings, wherein:

Figure 1:
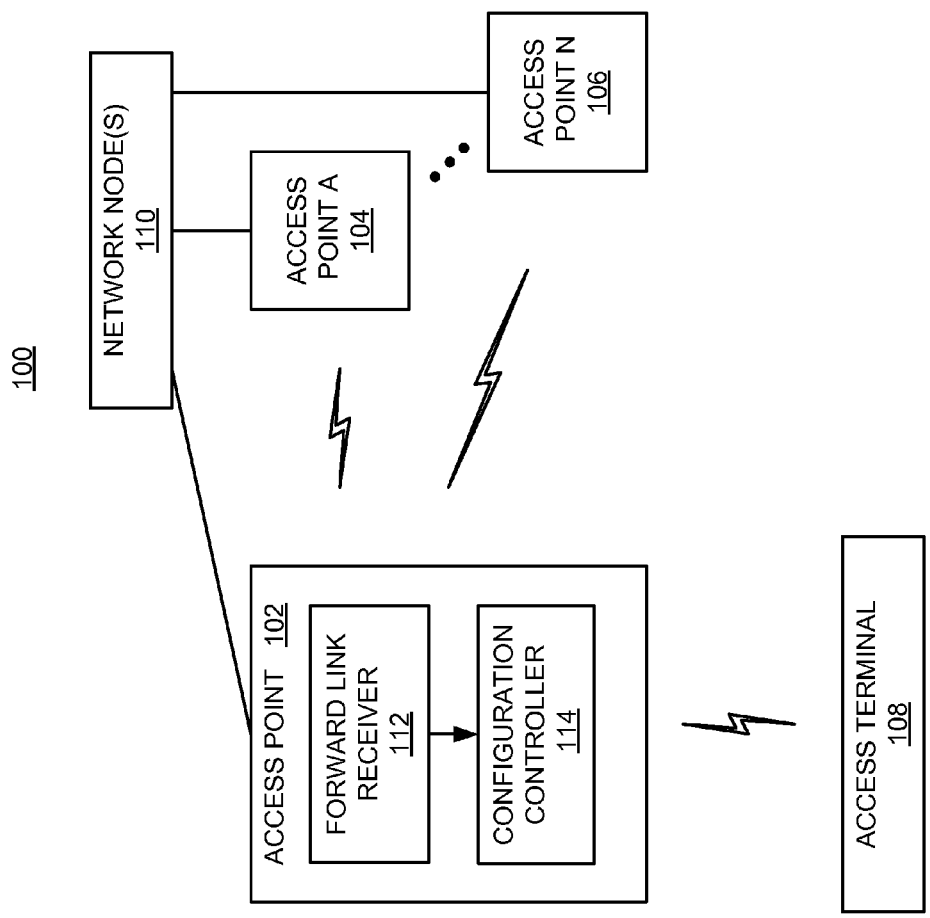
FIG. 1 is a simplified block diagram of several sample aspects of a communication system wherein an access point may be configured based on signals received from one or more access points in accordance with the teachings herein.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more network nodes, access points, and access terminals that communicate with one another. It should be appreciated, however, that the teachings herein may be applicable to other types of apparatuses or other similar apparatuses that are referenced using other terminology.

Access point 102 and neighboring access points A-N (represented by access points 104 and 106 and the associated ellipsis) in the system 100 provide one or more services (e.g., network connectivity) for one or more wireless terminals (e.g., access terminal 108) that may be installed within or that may roam throughout an associated geographical area. In addition, the access points 102-106 may communicate with one or more network nodes (represented, for convenience, by network node 110) to facilitate wide area network connectivity. Such network nodes may take various forms such as, for example, one or more radio and/or core network entities (e.g., a configuration manager; an operation, administration, management, and provisioning ("OAM&P") network entity; a mobility management entity; or some other suitable network entity).

FIG. 1 and the discussion that follows describe several techniques for configuring the access point 102 based, at least in part, on signals the access point 102 receives from one or more of the neighboring access points A-N. In a typical implementation the neighboring access points A-N comprise macro access points (e.g., as described below). The access point 102 includes a forward link receiver 112 that receives forward link signals transmitted by the neighboring access points A-N. In some aspects, these forward link signals may comprise pilot signals. For example, different access points in the system 100 may transmit pilots having different phase offsets of a pseudorandom number ("PN") sequence.

A configuration controller 114 of the access point 102 may then perform configuration operations such as determining a location of the access point 102 and defining timing for the access point 102 based on these or other signals that are received on the forward link. For example, the location of the access point 102 may be determined based on the relative timing of when the access point receives signals (e.g., pilot signals) from three or more base stations whose locations and signal transmission times are known. In addition, the timing for the access point 102 may be defined based on the timing of signals received at the access point 102 from another access point. Here, timing adjustments may be made to account for the distance between the access points.

In some aspects, the access point 102 may cooperate with the network node 110 during configuration operations. For example, the access point 102 may send information it obtains based on the forward link signals to the network node 110 and, in response, the network node 110 may send configuration information back to the access point 102. As will be described in more detail below, such configuration information may indicate the location of the access point 102 and/or may provide a timing adjustment for timing synchronization at the access point 102.

In some aspects configuration schemes as taught herein may be employed in a network that includes macro coverage (e.g., a large area cellular network such as a 3G network, typically referred to as a macro cell network or a Wide Area Network—WAN) and smaller coverage (e.g., a residence-based or building-based network environment, typically referred to as a Local Area Network—LAN). Here, as an access terminal ("AT") moves through such a network, the access terminal may be served in certain locations by access points that provide macro coverage while the access terminal may be served at other locations by access points that provide smaller area coverage of a femto cell. In some aspects, the smaller area coverage nodes may be used to provide incremental capacity growth, in-building coverage, and different services, all leading to a more robust user experience.

In the description herein, a node that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively. A simplified example of how femto nodes may be deployed in a network will now be described with reference to FIGS. 2-4.

Figure 2:
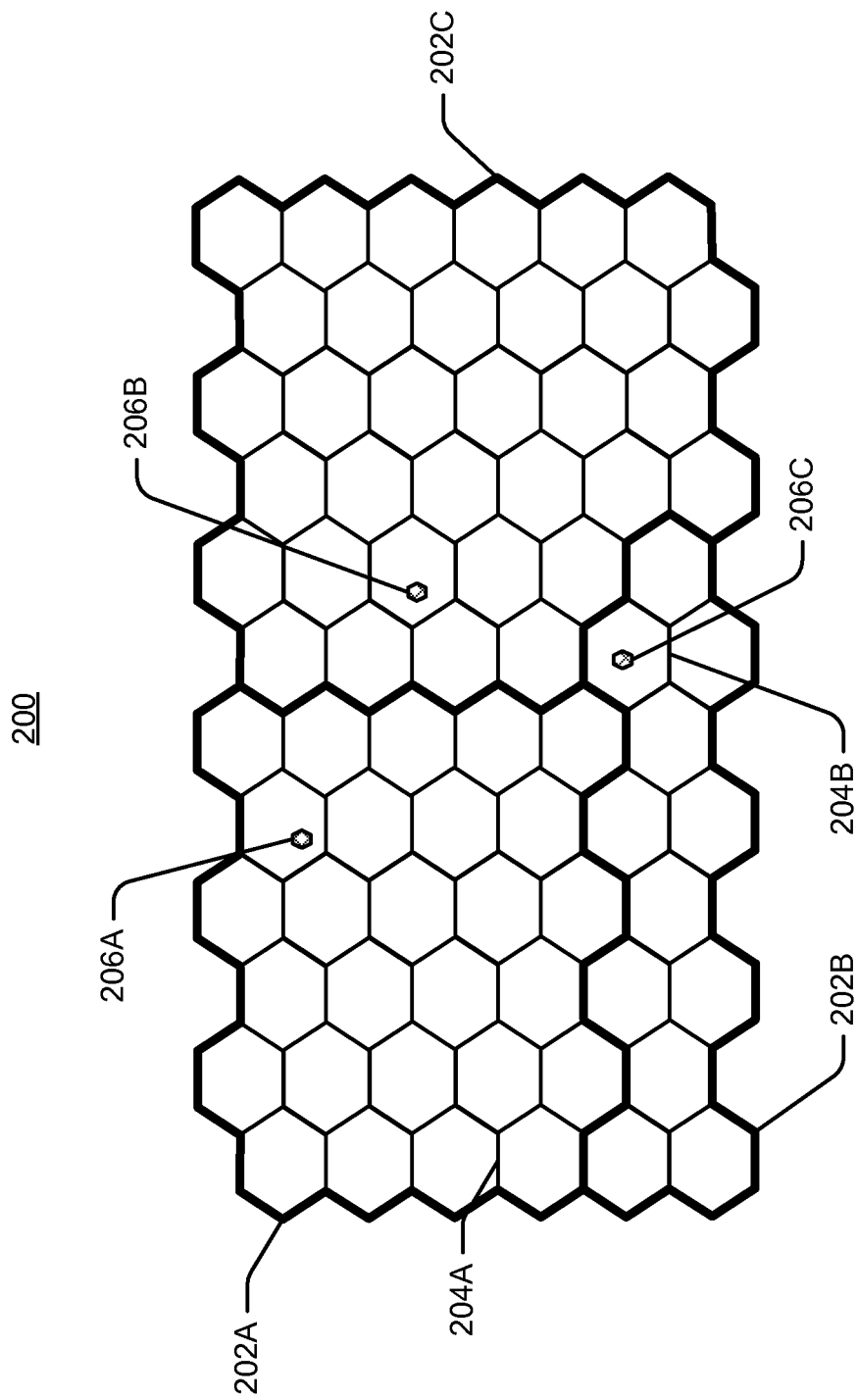
FIG. 2 is a simplified diagram illustrating sample coverage areas for wireless communication.

FIG. 2 illustrates an example of a coverage map 200 where several tracking areas 202 (or routing areas or location areas) are defined, each of which includes several macro coverage areas 204. Here, areas of coverage associated with tracking areas 202A, 202B, and 202C are delineated by the wide lines and the macro coverage areas 204 are represented by the hexagons. The tracking areas 202 also include femto coverage areas 206. In this example, each of the femto coverage areas 206 (e.g., femto coverage area 206C) is depicted within a macro coverage area 204 (e.g., macro coverage area 204B). It should be appreciated, however, that a femto coverage area 206 may not lie entirely within a macro coverage area 204. Also, one or more pico coverage areas (not shown) may be defined within a given tracking area 202 or macro coverage area 204. It should be appreciated that there could be multiple femto coverage areas within a macro coverage area, either within it or straddling across boundaries with adjacent macro cells.

Figure 3:
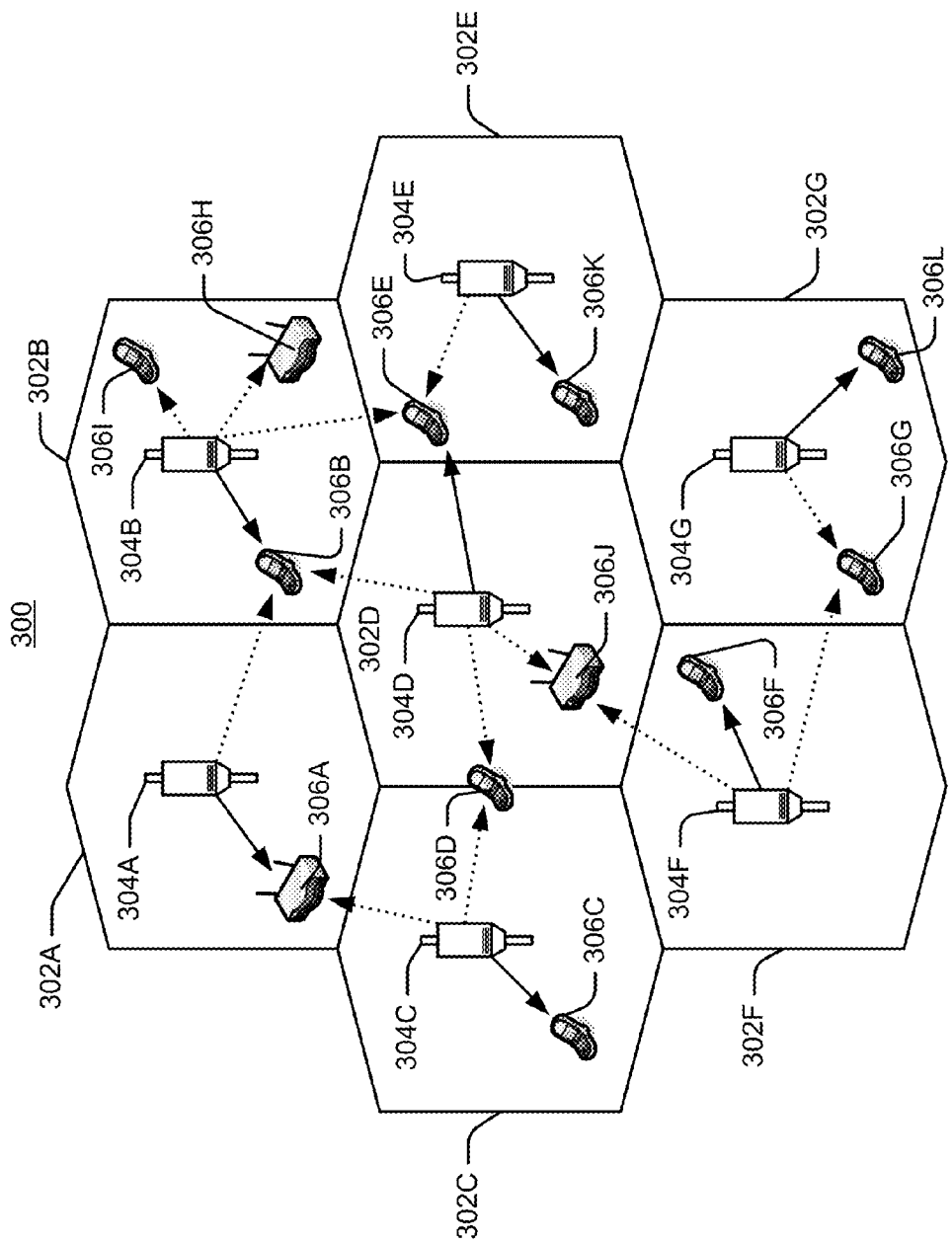
FIG. 3 is a simplified diagram of a wireless communication system including access points and access terminals.

FIG. 3 illustrates several aspects of a wireless communication system 300 comprising multiple cells 302, such as, for example, macro cells 302A-302G, with each cell being serviced by a corresponding access point 304 (e.g., access points 304A-304G). Thus, the macro cells 302 may correspond to the macro coverage areas 204 of FIG. 2. As shown in FIG. 3, access terminals 306 (e.g., access terminals 306A-306L) may be dispersed at various locations throughout the system over time. Each access terminal 306 may communicate with one or more access points 304 on a forward link ("FL") and/or a reverse link ("RL") at a given moment, depending upon whether the access terminal 306 is active and whether it is in soft handoff, for example. The wireless communication system 300 may provide service over a large geographic region. For example, macro cells 302A-302G may cover a few blocks in a neighborhood or several square miles in rural environment.

Figure 4:
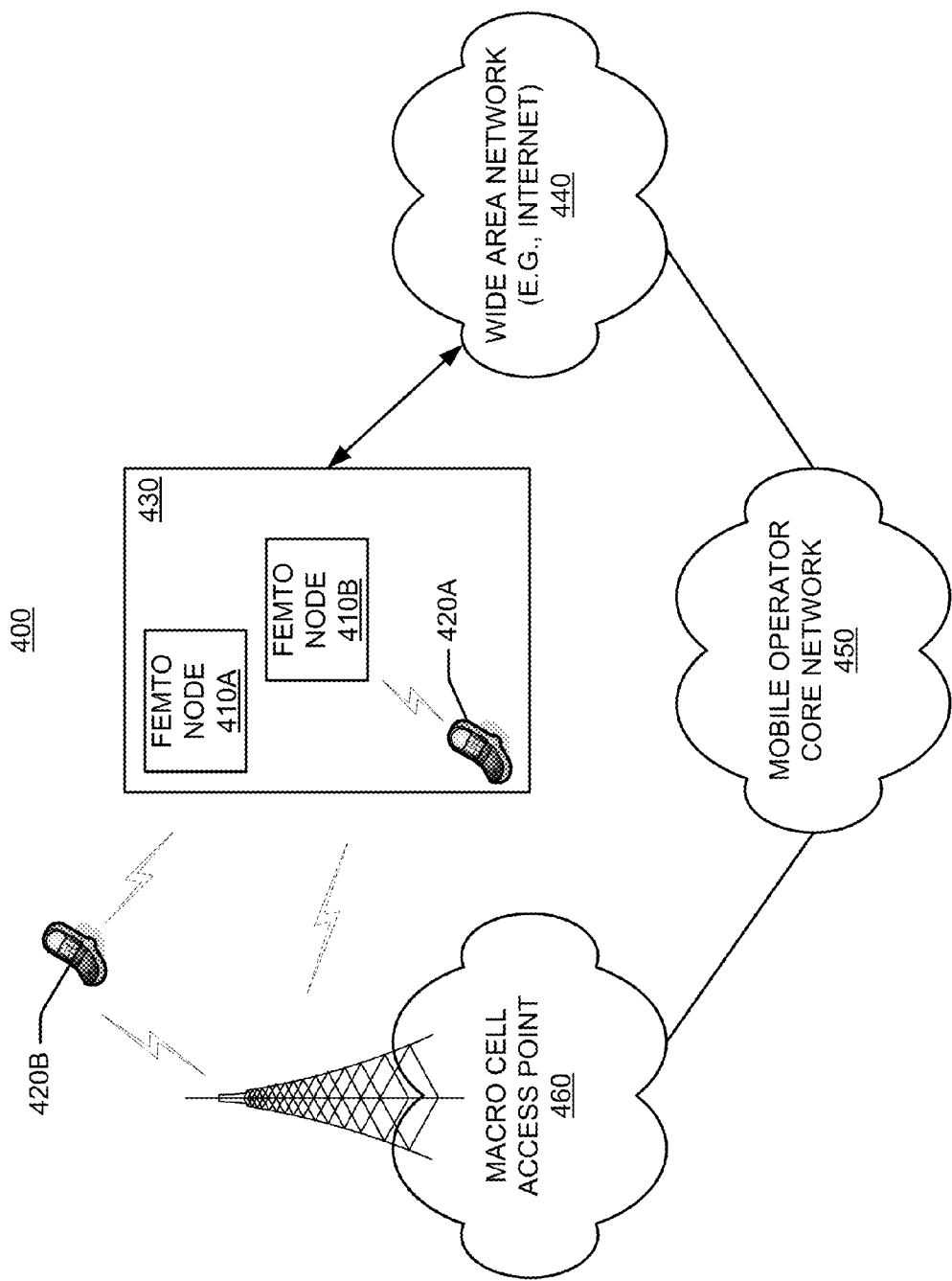
FIG. 4 is a simplified diagram of a wireless communication system including femto nodes.

FIG. 4 is an example of a system 400 that illustrates how one or more femto nodes may be deployed within a network environment (e.g., the system 300). The system 400 includes multiple femto nodes 410 (e.g., femto nodes 410A and 410B) installed in a relatively small area coverage network environment (e.g., in one or more user residences 430). Each femto node 410 may be coupled to a wide area network 440 (e.g., the Internet) and a mobile operator core network 450 via a DSL router, a cable modem, a wireless link, or other connectivity means (not shown).

The owner of a femto node 410 may subscribe to mobile service, such as, for example, 3G mobile service, offered through the mobile operator core network 450. In addition, an access terminal 420 may be capable of operating both in macro environments and in smaller area coverage (e.g., residential) network environments. In other words, depending on the current location of the access terminal 420, the access terminal 420 may be served by a macro cell access point 460 associated with the mobile operator core network 450 or by any one of a set of femto nodes 410 (e.g., the femto nodes 410A and 410B that reside within a corresponding user residence 430). For example, when a subscriber is outside his home, he may be served by a standard macro access point (e.g., access point 460) and when the subscriber is near or inside his home, he may be served by a femto node (e.g., node 410A). Here, a femto node 410 may be backward compatible with legacy access terminals 420.

Additional details relating to configuration operations that may be performed in accordance with the teachings herein will now be described with reference to FIGS. 5-12. Specifically, FIGS. 5-8 relate to determining the location of an access point and FIGS. 9-12 relate to defining timing for an access point.

A network that includes femto nodes may include one or more network entities that facilitate configuring the femto nodes. For example, such an entity may maintain information (e.g., location information) for various nodes (e.g., macro access points) in the network. In various implementations such an entity may be implemented as a stand-alone component or integrated into other common network components. For convenience, in the discussion that follows such functionality will be described as being implemented in the network node 110.

Figure 5:
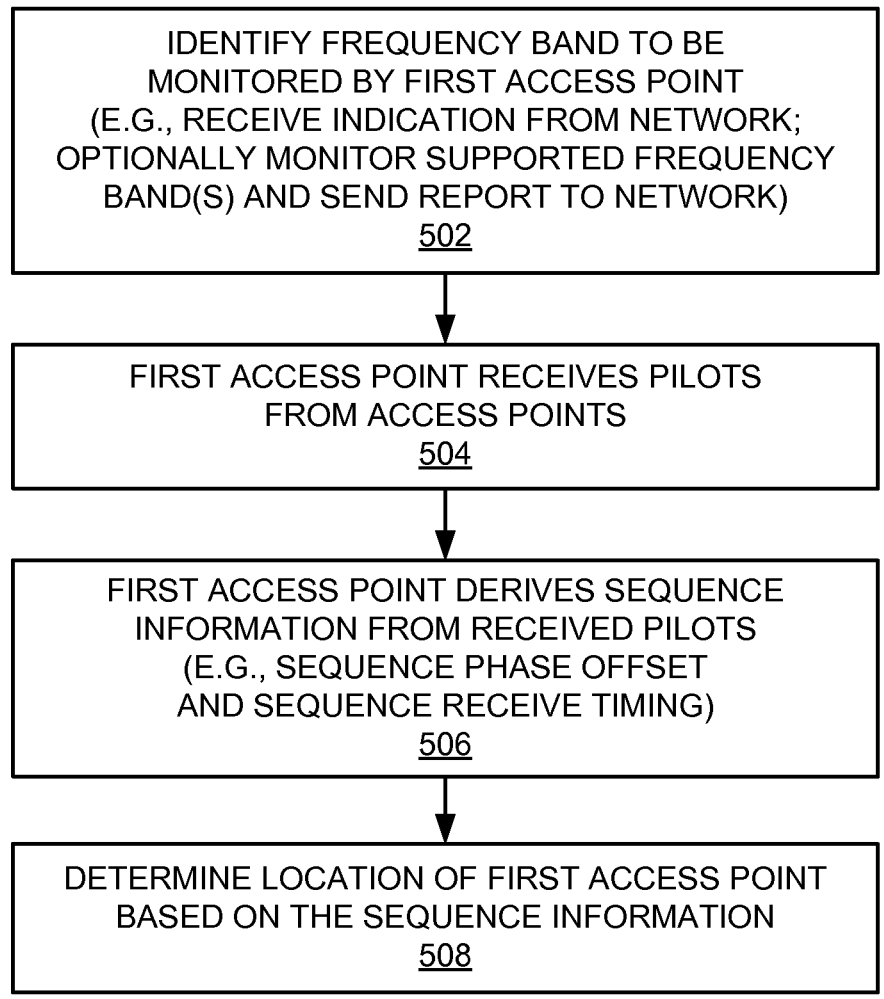
FIG. 5 is a flowchart of several sample aspects of operations that may be performed to determine a location of an access point in accordance with the teachings herein.
Figure 6:
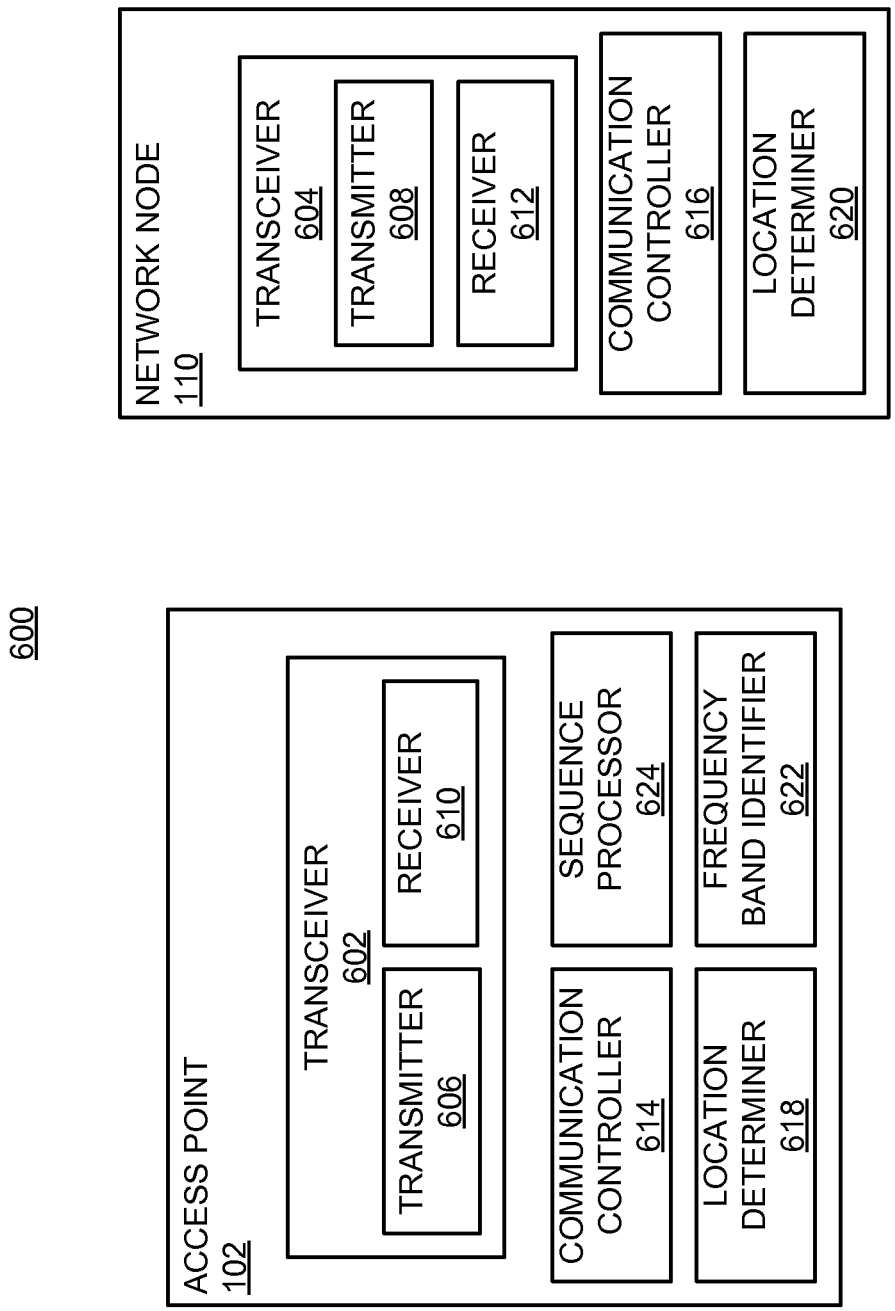
FIG. 6 is a simplified block diagram of several sample components of nodes configured to determine a location of an access point in accordance with the teachings herein.
Figure 10:
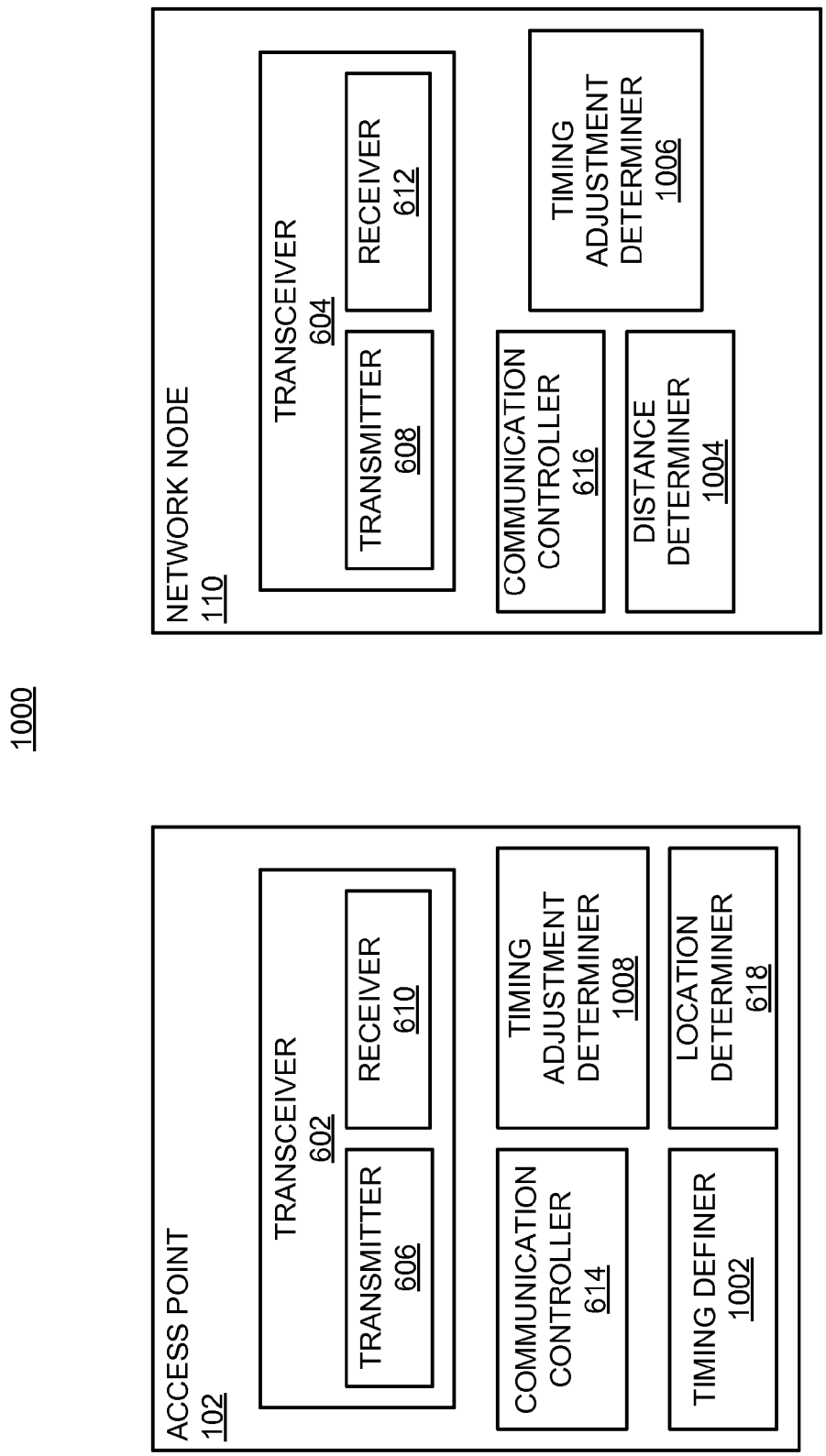
FIG. 10 is a simplified block diagram of several sample components of nodes configured to define timing for an access point in accordance with the teachings herein.

For illustration purposes, the operations of FIG. 5 (or any other operations discussed or taught herein) may be described as being performed by specific components (e.g., components of the system 100, a system 600 as shown in FIG. 6, and a system 1000 as shown in FIG. 10). It should be appreciated, however, that these operations may be performed by other types of components and may be performed using a different number of components. It also should be appreciated that one or more of the operations described herein may not be employed in a given implementation.

Referring initially to FIGS. 5 and 6, FIG. 5 describes several operations that may be performed by different nodes to determine the location of an access point and FIG. 6 illustrates several sample components that may be incorporated into nodes such as the access point 102 (e.g., a femto node or a pico node) and/or the network node 110 to perform such operations. These operations may be performed, for example, before the access point is activated for communication operations.

It should be appreciated that the components illustrated for a given one of these nodes may be incorporated into one or more other nodes in a communication system. For example, other femto nodes in a system may include components similar to those described for access point 102. It also should be appreciated that a node may contain one or more of the described components. For example, an access point may contain multiple transceiver components that enable the access point to receive on a reverse link and a forward link, to operate on multiple frequencies, or to serve multiple access terminals simultaneously. Also, some of the functionality described herein may be distributed over multiple nodes. For example, configuration-related functionality may be distributed among several network nodes.

As shown in FIG. 6, the access point 102 and the network node 110 include transceivers 602 and 604, respectively, for communicating with each other and with other nodes. Each transceiver includes a respective transmitter (transmitters 606 and 608) for sending signals (e.g., messages) and a respective receiver (receivers 610 and 612) for receiving signals.

The nodes of FIG. 6 also include other components that may be used in conjunction with configuration operations as taught herein. For example, the nodes may include respective communication controllers 614 and 616 for managing communication with other nodes (e.g., sending and receiving messages/indications) and for providing other related functionality as taught herein. One or more of the nodes may include a location determiner (e.g., location determiner 618 or 620) for determining the location of the access point 102 and for providing other related functionality as taught herein. Sample operations of the other components of FIG. 6 are described below.

Referring now to the operations of FIG. 5, as represented by block 502, one or more frequency bands (e.g., channels) to be monitored by the access point 102 in conjunction with location determining operations are identified. In some implementations, the access point 102 may be configured to only monitor a frequency band that is reserved for macro access points (e.g., femto nodes or pico nodes are not allowed to operate on such a frequency band). In this way, the location determination operation may be based only on signals received from macro access points that are more reliable than other types of nodes in the system. For example, in contrast with the femto nodes that may be deployed in a given system, a macro access point may always be powered on, may always be located at a known location, and may transmit higher strength pilot signals.

The access point 102 (e.g., a frequency band identifier 622) and/or the network node 110 may perform operations to identify the frequency band(s). For example, in some implementations each frequency band to be monitored is predefined whereby the access point 102 may simply retrieve this information from a data memory. In some implementations the access point 102 may maintain a record of the frequency bands on which it previously received pilot signals. For example, if an access point 102 had been turned off, upon re-applying power, such information may be retrieved from the femto cell non-volatile memory, or downloaded from a network node 110 which maintains repository of such information. In such a case, the access point 102 also may maintain a record of the PN phase offsets it received on those frequency bands, or it may download such a record from a network node 110. By maintaining previously used parameters in this way, the access point 102 may conduct faster searches upon power-up (or reset, etc.).

In some implementations the network node 110 may identify the frequency band(s) and send a corresponding indication to the access point 102. Thus may occur, for example, during an initial configuration process when the access point 102 accesses an operator's core network to initiate activation of the access point 102.

The selection a frequency band may be based on various criteria. For example, in some implementations this selection may be based on the identity of a particular access point sold to a particular customer and that customer's address. In some implementations the selection may be based on a database lookup of the address associated with a termination point of a fixed broadband connection to which the access point is attached.

In some implementations the access point 102 may monitor a set of one or more supported frequency bands and send a message to the network node 110 (e.g., an OAM&P entity) indicative of the results of the monitoring. For example, the message may indicate the signals (e.g., PN sequence phase offsets of pilots received from macro access points) that are received on each of the supported frequency bands. Based on this information (e.g., based on the locations of the identified macro access points), the network node 110 may specify which frequency band or bands the access point 102 is to monitor.

As represented by block 504 in FIG. 5, the access point 102 may then monitor the identified frequency band or frequency bands to receive signals (e.g., pilot signals) from a plurality of access points. In some aspects, to facilitate a location determining operation such as a triangulation (sometimes referred to as trilateration) operation, the access point 102 may acquire signals from three or more access points. As mentioned above, in some implementations the access point 102 may maintain a record of the pilot signals (e.g., the PN phase offsets) that were previously received by the access point 102. In such a case, the access point 102 may first attempt to acquire these pilot signals each time it performs a location determination operation.

The receiver 610 may include appropriate forward link receiver components to facilitate receiving signals from other access points (e.g., access points A-N in FIG. 1). Here, the access point 102 may receive over the forward link in a manner that does not conflict with forward link transmissions by the access point 102. For example, the access point 102 may receive forward link signals during a time period that the access point 102 is not transmitting on a forward link (e.g., when the access point 102 is being activated and is not yet using the forward link for user traffic). Also, the access point 102 may receive forward link signals on a different frequency than the access point 102 is using for transmissions on a forward link. In such a case, the access point 102 may be able to concurrently transmit and receive forward link signals.

In some implementations the receiver 610 may not include all of the functionality that may otherwise be used in a forward link receiver (e.g., a forward link demodulator a mobile station modem). For example, the receiver 610 may have functionality to decode the synch channel from a macro base station but may not include message exchange (e.g., layer 3) functionality. In any event, such forward link receiver functionality may be advantageously used for other operations of the access point 102. For example, such functionality may be used to determine a neighbor list or other information for other configuration operations such as assignment of radio parameters (e.g., pilot PN offset).

The use of a forward link receiver may, in some aspects, provide more effective location determination than other schemes. For example, as compared to a scheme that uses a GPS receiver to determine location, a scheme that uses a forward link receiver may have less restrictive placement and may not require a remote antenna. Thus, the access point may reliably receive signals even if it is placed in the basement or lower floors of the building. In contrast, it may be difficult to receive GPS signals reliably in large, dense cities with "urban canyons" and multi-story buildings. In such a case, a remote antenna may be required in a GPS-based system due to the lack of sufficient strong GPS signals. A forward link scheme also may provide faster timing acquisition than a GPS system.

In addition, such a scheme may be "cellular aware" whereby interference may be identified to facilitate optimal placement of the femto access point.

As represented by block 506 of FIG. 5, the signals generated by the neighboring access points may comprise sequence information that the access point 102 (e.g., a sequence processor 624) may derive upon acquiring these signals. For example, each neighboring macro access point may generate a pilot signal based on a different pseudorandom number ("PN") sequence offset (e.g., PN phase offset). Accordingly, the sequence processor 624 may identify different pilot signals by their unique PN phase offsets. In addition, the sequence processor 624 may cooperate with the receiver 610 to determine timing associated with receipt of each pilot signal. Here, the receive timing may correlate to the time at which a given aspect (e.g., the beginning) of the associated PN sequence is received.

In some implementations, it may be possible to determine whether a given pilot signal was transmitted by a macro access point or some other type of node (e.g., a femto node) based on the PN phase offset. For example, a known subset of the PN phase offsets available for use in a network may be dedicated for use by macro access points.

As represented by block 508, the location of the access point 102 may then be determined based on the sequence information. For example, the location of the access point 102 may be determined based on the times at which the access point 102 received PN sequences from the neighboring access points, based on the locations of the neighboring access points, and based on the times at which the neighboring access points transmitted their respective PN sequences. In particular, the propagation delay corresponding to the time at which a neighboring access point transmitted at PN sequence and the time at which the access point 102 received that PN sequence is indicative of the distance between these access points (e.g., signal propagation delay time divided by the speed of light). The distances between the access point 102 and each of the neighboring access points may therefore be determined based on the signals received by the access point 102. A triangulation operation may then be employed to determine the location of the access point 102 based on these distances and the known locations of the neighboring access points.

Once the location of the access point 102 is determined, this location may be used for additional configuration operations or for other operations. These operations may include, for example, synchronization operations (e.g., as discussed at FIG. 9), enabling an operator to ascertain that the access point 102 is within a territory that it is licensed to operate, and configuring the access point 102 with information used in overhead messages. With regard to synchronization of the access point 102, if the location of the access point 102 is known, the pilot PN offset timing (e.g., used for the synchronization) for the access point 102 may be improved for cdma2000 or other systems.

In some aspects, the location of the access point 102 may be used as an estimate of the location of an associated access terminal (e.g., that is idling on or connected to the access point 102). Here, the location of the access point 102 may provide a relatively precise estimate of the location of the access terminal in cases where the coverage area of the access point 102 is relatively small (e.g., on the order of 10 meters). This location information may then be used for emergency calling or other operations. For example, with regard to locating a telephone that is making an emergency call, regulations in the United States (and possibly other countries) require that it be possible to determine the location of a caller with relative precision. Though it may be possible for the caller's location to be determined by a macro network to (or through) which the phone communicates, if the call is made using a femto node and the femto node location can be accurately determined, it may be faster and more reliable to assume the caller's location to be the same as that of the femto node, since the range of a femto node may be relatively small (e.g., the caller may necessarily be very close to the femto node when making such a call).

In some aspects, the access point 102 may be able to more reliably determine its location than an access terminal is able to determine its location. For example, since the location of the access point 102 may be relatively fixed (e.g., as compared to an access terminal), the access point 102 may continuously receive signals from neighboring macro access points. Accordingly, the access point 102 may search for signals (e.g., CDMA pilots) of the neighboring macro access points over a long period of time. The access point 102 may then integrate the signals (e.g., accumulate energy over a period of time) from these neighboring access points with the result that the access point 102 may reliably acquire relatively weak pilot signals. Here, the access point 102 may not be limited by battery consumption constraints (e.g., as access terminal may be). In addition, the access point 102 may advantageously employ antenna configurations that have higher gain, receive diversity, and steerable elements. In addition, such advanced antenna configurations may have other benefits such as interference reduction and improved link performance.

In some implementations other location determining techniques may be used in conjunction with the forward link-based scheme taught herein. For example, an address database that specifies the latitude/longitude of the household within which the access point 102 is installed may be used as a consistency check to verify the location determined by the forward link-based scheme.

The actual location of the access point 102 may be calculated by operation of the access point 102 independently or by cooperation of the access point with another node. For example, FIG. 7 describes a scheme where a network entity (e.g., the network node 110) may calculate the location of the access point 102 based on sequence information provided by the access point 102. In such a case, the access point 102 may determine its location by sending the sequence information to the network node 110 and receiving an indication of the location in response. Conversely, FIG. 8 describes a scheme where the access point determines its location by performing a calculation based on received macro signals and received information that indicates the locations of the neighboring access points.

Figure 7:
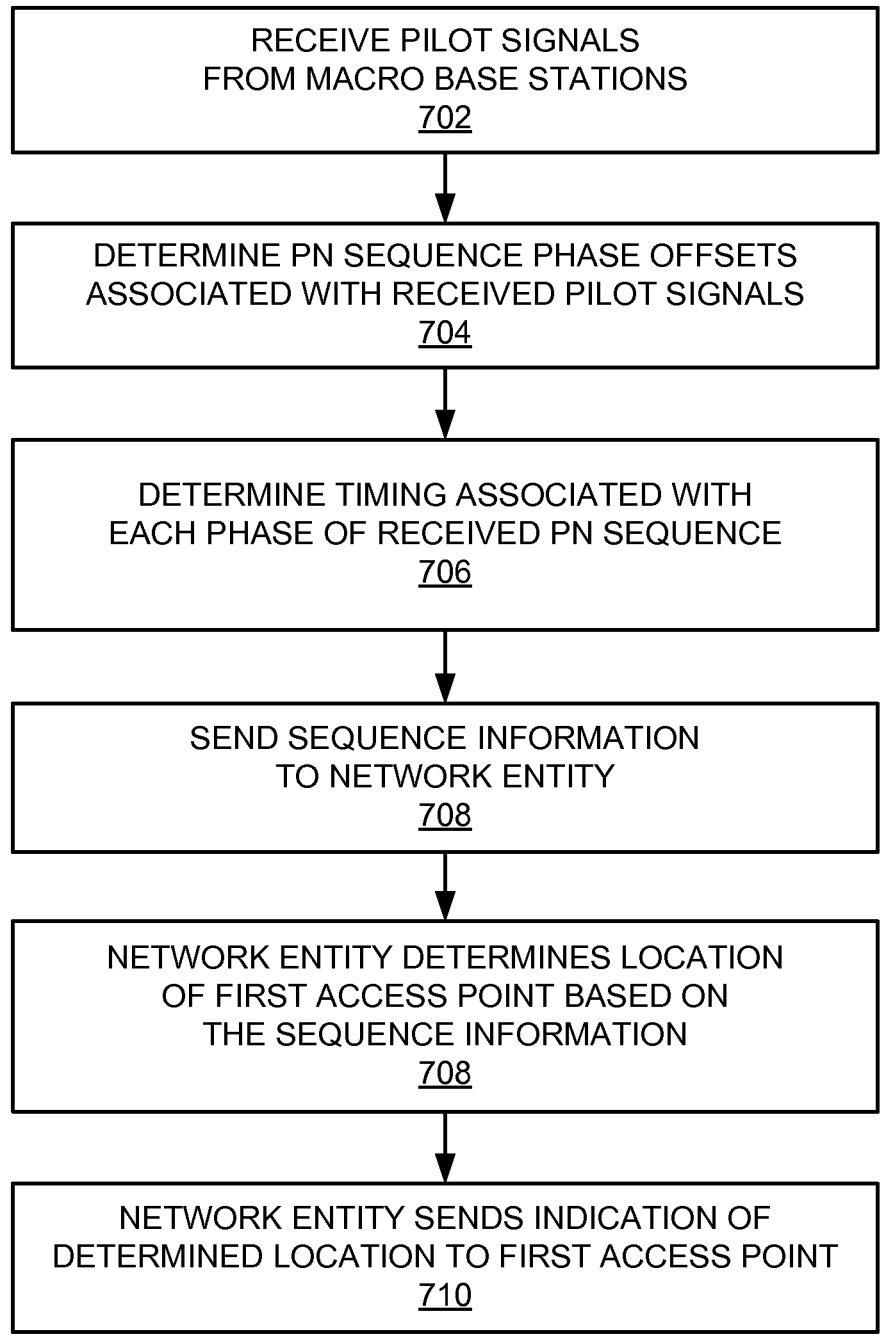
FIG. 7 is a flowchart of several sample aspects of operations that may be performed to determine a location of an access point in accordance with the teachings herein.

Referring to FIG. 7, the access point 102 receives pilot signals from macro base stations as represented by block 702. As discussed above, the access point 102 may be configured to monitor one or more designated frequency bands for these pilot signals. In some implementations, the access point 102 may synchronize itself with the strongest pilot found. The access point 102 may then perform a prolonged and comprehensive search for all of the pilots it is capable of receiving. In this way, the access point 102 may detect pilot signals that have very low chip energy-to-interference (e.g., Ec/Io) values. As mentioned above, the access point 102 may accomplish this without having forward link receiver capability for decoding all overhead messages from the macro access points.

As represented by block 704, the access point 102 may determine PN phase offsets associated with the received pilot signals (e.g., in conjunction with detection of each pilot signal). That is, the access point 102 may determine a first PN phase offset of the pilot signals received from a first one of the neighboring macro access points, a second PN phase offset of the pilot signals received from a second one of the neighboring macro access points, and so on.

As represented a block 706, the access point 102 also may determine timing associated with the receipt of the pilot signals. For example, the access point 102 may determine a first time at which the first PN phase offset (e.g., a defined aspect of the sequence) is received, a second time at which the second PN phase offset is received, and so on. In some aspects, the timing information may comprise relative timing that indicates, for example, the time delta between the receipt of a signal from one macro access point and the receipt of a signal from another access point.

As represented by block 708, the access point 102 sends the sequence information acquired at blocks 704 and 706 to the network node 110 (e.g., an OAM&P entity). The network node 110 (e.g., the location determiner 620) may then determine the location of the access point 102 by identifying known macro access points based on the sequence information (e.g., PN phase offsets). Here, the network node 110 may maintain information about the macro access points in the system such as the location of each access point (e.g., the latitude and longitude), and the PN phase offset used by each macro access point. Accordingly, the network node 110 may use the locations of detected macro access points in a triangulation operation to determine the location of the access point 102 as discussed above.

As represented by block 710, the network node 110 may then send an indication of the location of the access point 102 to the access point 102. The access point 102 may then use this location information as discussed herein (e.g., the access point 102 may send this information to another node).

Figure 8:
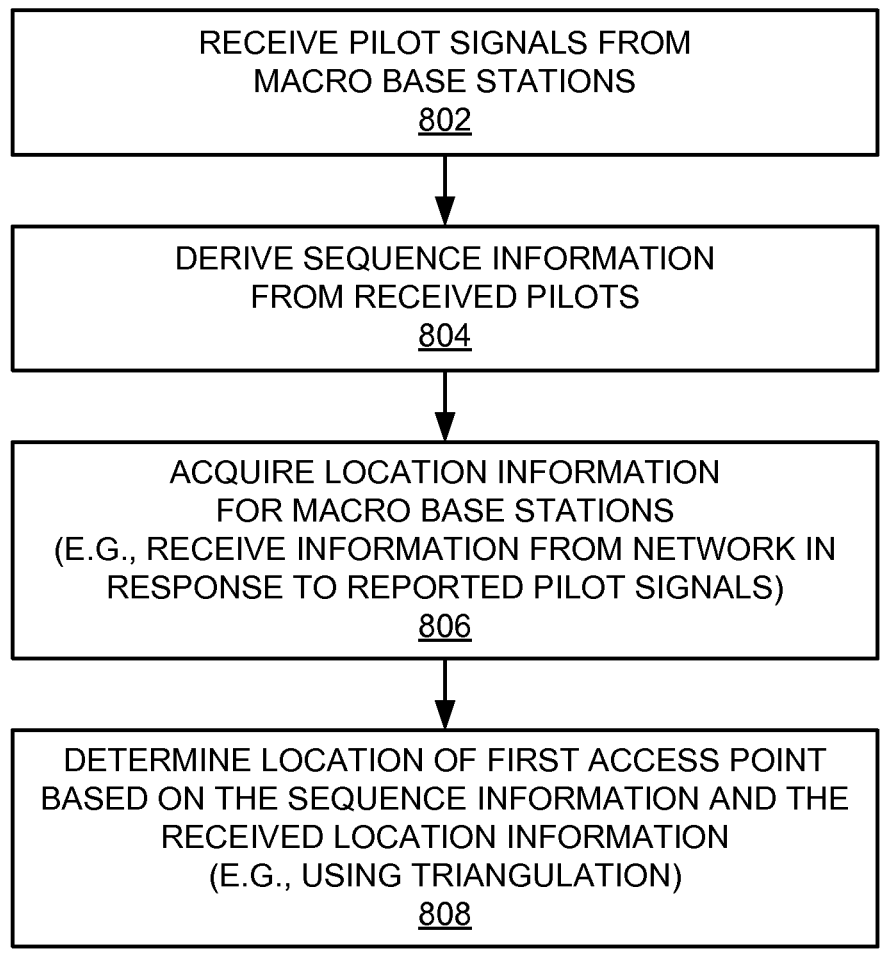
FIG. 8 is a flowchart of several sample aspects of operations that may be performed to determine a location of an access point in accordance with the teachings herein.

Referring now to FIG. 8, as mentioned above, in some implementations the access point 102 may perform location determining operations similar to the operations of block 708 discussed above. At blocks 802 and 804, the access point 102 receives pilot signals and derives sequence information from those received signals as discussed above.

As represented by block 806, in this implementation the access point 102 is configured with information indicative of the locations of the neighboring macro base stations. Here, location information for a given macro access point may be associated with the PN phase offset used by that macro access point. In some implementations the access point 102 may be configured with this information when it is placed in service. In some implementations the access point 102 may receive this information from the network node 110 (e.g., an OAM&P entity). For example, the access point 102 may send a message to the network node 102 that indicates which pilot signals are being received at the access point 102. In response, the network node 110 may send the location information for the corresponding macro access points to the access point 102.

As represented by block 808, the access point 102 may then determine its location based on the sequence information it derived at block 804 and based on the location information it acquired at block 806. For example, the location determiner 618 may be configured to determine the distances from the access point 102 to the neighboring access points and perform a triangulation operation to determine the location of the access point 102.

Figure 9:
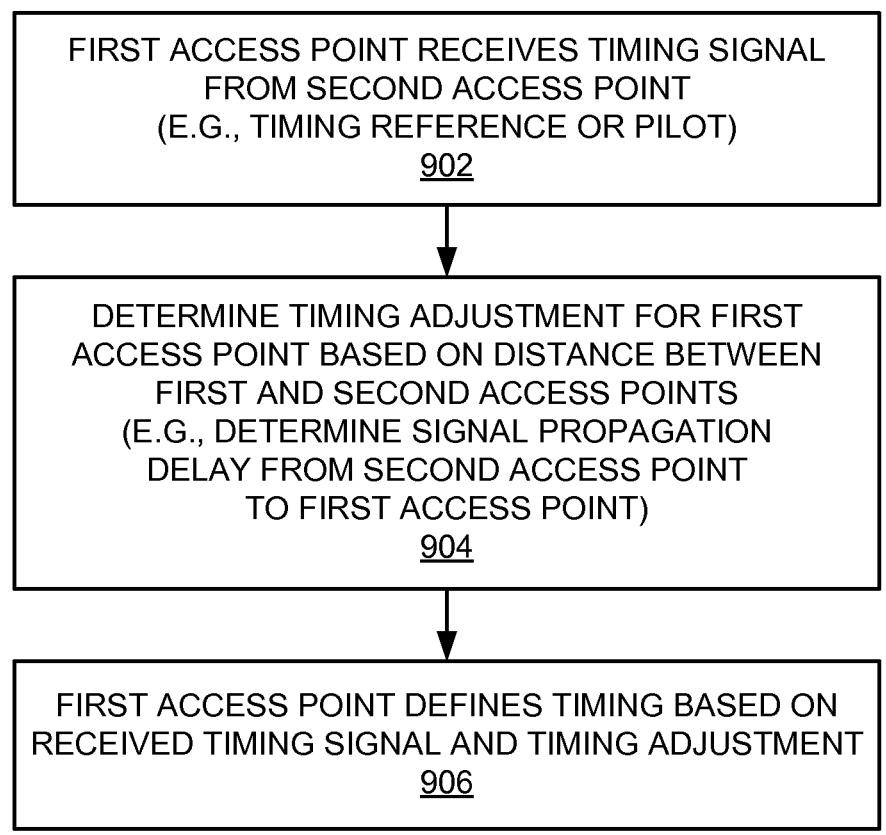
FIG. 9 is a flowchart of several sample aspects of operations that may be performed to define timing for an access point in accordance with the teachings herein.

Referring now to FIGS. 9 and 10, several operations and components that may be used to define timing for an access point will be described. Here, the timing of an access point may be controlled to maintain synchronization with the timing of other nodes in an associated network. For example, a CDMA system may mandate relatively strict timing tolerances for the access points in the system to enable access terminals to reliably utilize search windows to acquire CDMA signals from the access points. The configuration operations described below may be implemented, for example, as a one-time operation (e.g., during initialization) prior to commencing forward link transmissions.

As represented by block 902 of FIG. 9, the access point 102 (e.g., a femto node or pico node) receives a timing signal from another access point (e.g. the closest macro access point). For purposes of illustration, this other access point will be referred to as the macro access point 104 in the discussion that follows. In some implementations the timing signal may comprise a timing reference signal (e.g., that provides an indication of an absolute or relative time). In some implementations the timing signal may comprise a signal from which the access point 102 may derive an absolute or relative time. For example, the timing signal may comprise a pilot signal (e.g., comprising a PN sequence) associated with a known transmission time interval.

In a similar manner as described above, the access point 102 may incorporate a forward link receiver for receiving forward link signals that are used to define the timing of the access point 102. Through the use of such forward link-based techniques, synchronization may be achieved while providing the advantages described above. For example, synchronization may be achieved in locations where GPS-based synchronization may not be achieved. In addition, components that may already be used for other purposes may be used for synchronization operations, thereby reducing the cost of the access point 102. For example, forward link receiver may be used in a femto node to assist in neighbor list configuration, to set transmit power of the femto node, etc.

The synchronization scheme described herein also may provide more precise timing than may be attained through the use of other synchronization schemes. For example, a timing reference obtained from the Internet may not provide the desired level of accuracy and stability (e.g., on the order of 1 microsecond). Moreover, since the backhaul to an access point may not be under the control of a wireless network operator, the backhaul may experience delays in jitter that are outside the timing tolerance required for effective system operation (e.g., CDMA operation).

As represented by block 904, a timing adjustment is determined for the access point 102 based on the distance between the access points 102 and 104. This timing adjustment may be used to compensate for any delay between the time at which the timing signal transmits the access point 104 and the time at which the access point 102 receives the timing signal. For example, the timing adjustment (e.g., representing a phase delay) may be set equal to the signal propagation delay time from the access point 104 to the access point 102 which may be determined based on the distance between access points 102 and 104 (e.g., the determined distance is divided by the speed of light). To this end, the system may maintain information indicative of the identity and the locations of base stations in the system.

The locations of these access points may be determined in various ways. For example, the location of a given access point may be determined based on forward link triangulation techniques as described herein, based on GPS technology, based on an address database, or based on some other suitable technique. In some implementations the access points 102 and 104 may determine their respective locations and provide that information, if applicable, to another node in the system.

In some implementations a given node (e.g., the network node 110) may determine the location of either or both of the access points 102 and 104.

As represented by block 906, the access point 102 (e.g., a timing definer 1002) may then define its timing based on the timing signal received a block 902 and the timing adjustment determined at block 904. In this way, the access point 102 may synchronize its timing to the timing of the access point 104. As an example, if it is determined based on the distance between access points 102 and 104 that the signal propagation delay from the access point 104 to the access point 102 is 15 microseconds, the timing derived from the timing signal may be adjusted (e.g., advanced) by a timing adjustment of 15 microseconds.

In some implementations the timing for the access point 102 may be defined based on timing signals received from more than one node (e.g., macro access points). In such a case, a unique timing adjustment may be determined for each of these timing signals based on the distance between the access point 102 and the access point that transmitted that timing signal.

In some implementations the access point 102 determines its timing based on the timing signals received from a selected one of these nodes. In this case, the access point 102 may use the timing adjustment that corresponds to the selected timing signal to define its timing.

In other implementations the access point 102 may determine its timing based on timing signals received from several nodes. For example, the access point 102 may calculate a first time value using a first timing signal and its associated timing adjustment, calculate a second time value using a second timing signal and its associated timing adjustment, and so on. The access point 102 may then define a final time value based on these time values. For example, in some implementations a second time value may simply be used to corroborate a first time value. In some implementations, a final time value may be calculated based on a combination of the time values. For example, a final time value may comprise a weighted average of the first time value, the second time value, and so on. In some implementations the weighting may be based on the expected reliability of the timing signal from a given source. For example, the timing signal having the highest receive signal strength may be given a higher weight than timing signals having a lower receive signal strength. In another example, the timing signal from the closest timing source may be given a higher weight than the timing signal from a timing source that is further away.

In some implementations the access point 102 may measure the phase shift differentials it observes based on signals from different macro access points and use this information to verify the timing. Here, a phase delay differential computed by the access point 102 based on received signals may be expected to correspond to a phase delay differential computed based on the knowledge of the macro access point locations.

The timing adjustment for the access point 102 may be calculated by operation of the access point 102 independently or by cooperation of the access point 102 with another node. For example, FIG. 11 describes a scheme where a network entity (e.g., the network node 110) may calculate the timing adjustment based on location information provided by the access point 102. In such a case, the access point 102 may determine its timing adjustment by sending the location information to the network node 110 and receiving an indication of the timing adjustment in response. Conversely, FIG. 12 describes a scheme where the access point 102 determines its own timing adjustment based on received macro signals and received information that indicates the location of the access point 104.

Figure 11:
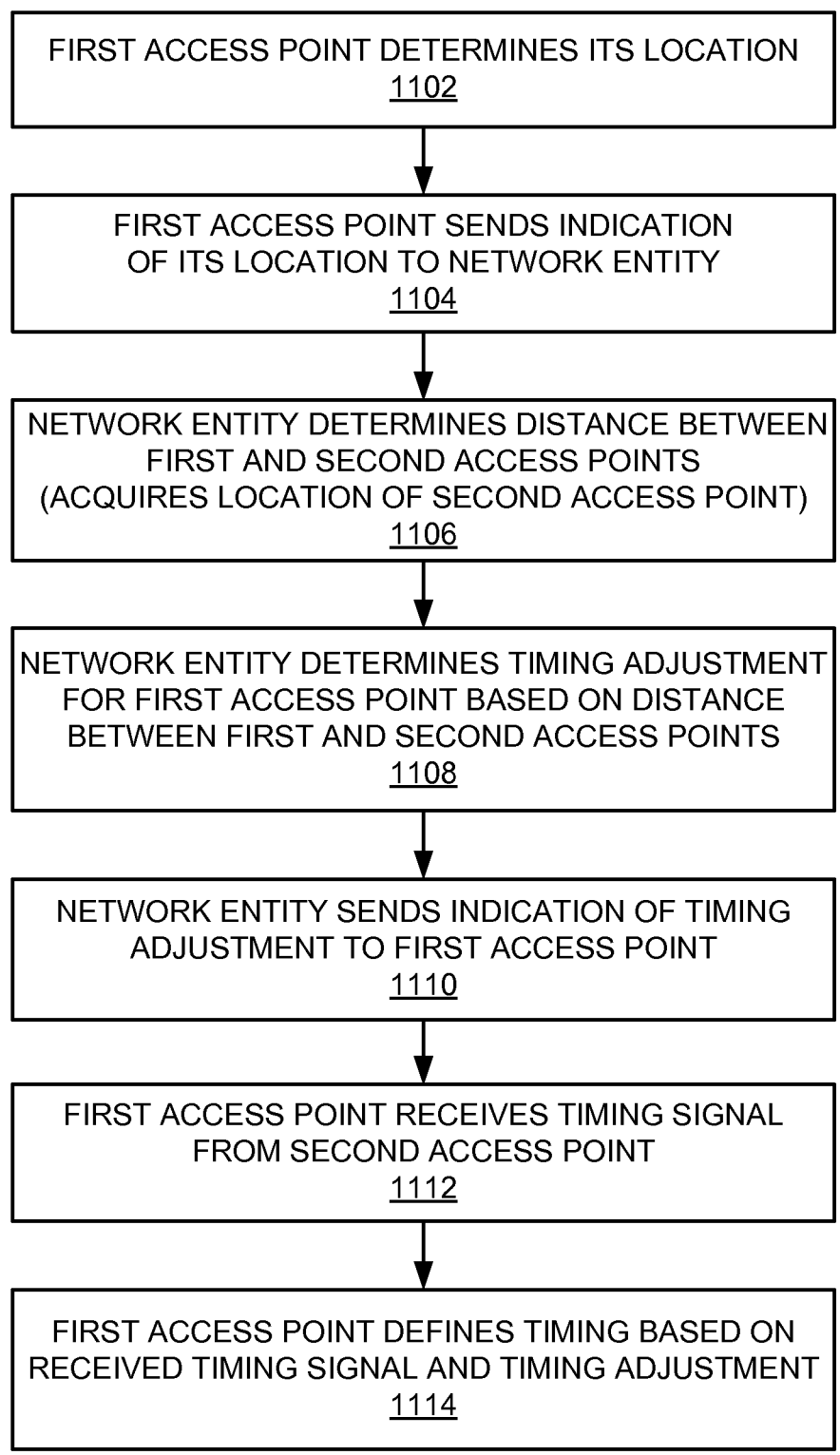
FIG. 11 is a flowchart of several sample aspects of operations that may be performed to define timing for an access point in accordance with the teachings herein.

Referring to FIG. 11, blocks 1102 and 1104 relate to implementations where the access point 102 (e.g., the location determiner 618) determines its location. In some implementations, the access point 102 may determine its location based on pilot signals received from neighboring macro base stations as discussed above. It should be appreciated that other implementations may use other techniques to determine the location of the access point 102. As represented by block 1104, in this example the access point 102 sends an indication of its location to the network node 110 (e.g., an OAM&P entity).

As represented by block 1106, the network node 110 (e.g., a distance determiner 1004) determines the distance between access points 102 and 104 based on information the network node 110 acquires regarding the locations of the access points 102 and 104. In some implementations the network node 110 may be configured with a record of the locations of the macro access points in the system. Thus, the network node 110 may have ready access to the location of the access point 104. In some implementations the network node 110 may receive this location information from the macro access point 104. Alternatively, the network node 110 may determine this information in some other way. In cases where the timing of the access point 102 is based on timing signals received from several access points, the network node may determine the distance between the access point 102 and each of these access points.

As represented by block 1108, the network node 110 (e.g., a timing adjustment determiner 1006) determines a timing adjustment for the access point 102 based on the distance between the access points 102 and 104 (e.g., as discussed above at block 904). The network node 110 then sends an indication of this timing adjustment and the identity of the corresponding macro access point (e.g., the PN phase offset for that access point) to the access point 102 as represented by block 1110. In cases where the timing of the access point 102 is based on timing signals received from several access points, the network node 1110 may provide timing adjustments corresponding to each of these timing signals.

As represented by block 1112, at some point in time the access point 102 receives a timing signal from the access point 104 (and timing signals from other access points in those cases where the timing of the access point 102 is also based on these timing signals). This operation may thus correspond to the operation described above in conjunction with block 902.

As represented by block 1114, the access point 102 may then define its timing based on the received timing signal(s) and the received timing adjustment(s). This operation may thus correspond to the operation described above in conjunction with block 906.

Figure 12:
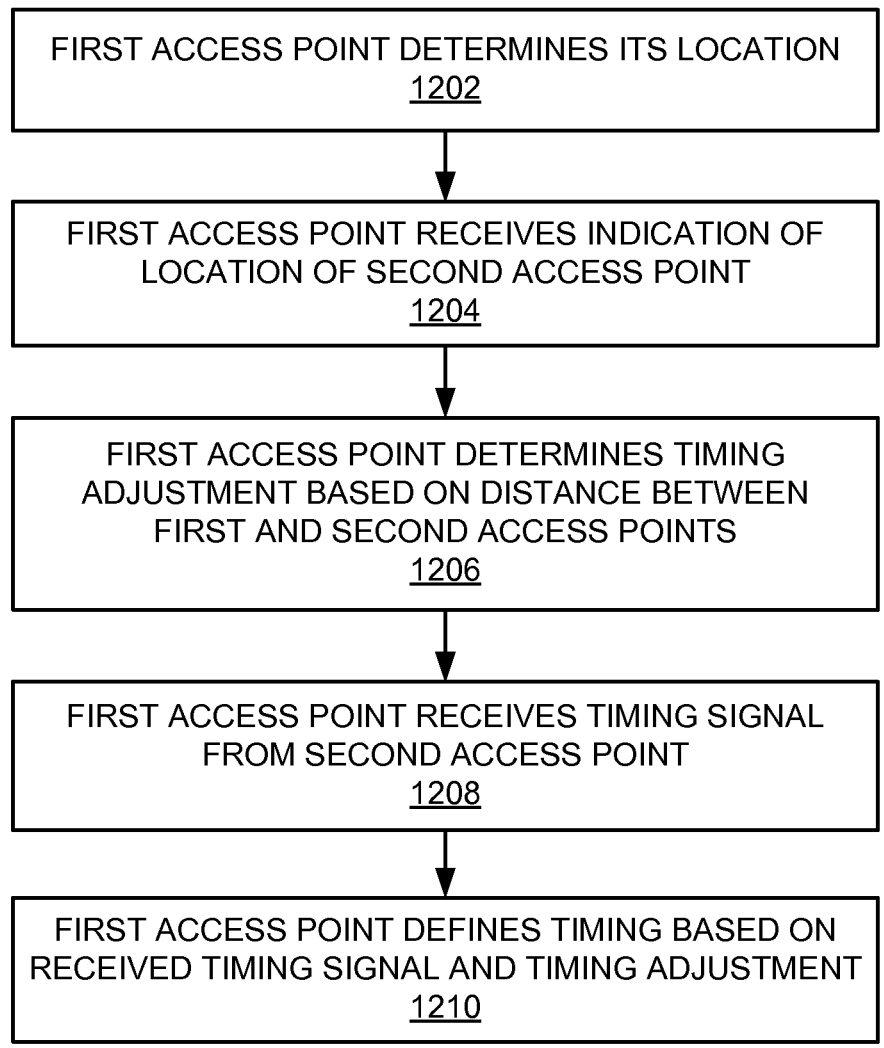
FIG. 12 is a flowchart of several sample aspects of operations that may be performed to define timing for an access point in accordance with the teachings herein.

Referring now to FIG. 12, as mentioned above, in some implementations the access point 102 may perform timing adjustment determining operations similar to the operations of block 1108 discussed above. At block 1202, the access point 102 may determine its location as discussed above. At block 1204, the access point 102 receives an indication of the location of the access point 104 (and optionally any other access points that send timing signals). For example, the access point 102 may receive this indication directly from the access point 104 or from the network node 110. As represented by block 1206, the access point 102 (e.g., a timing adjustment determiner 1008) determines the timing adjustment based on the distance between the access point 102 and the access point 104 (and optionally one or more other access points) as discussed above. The access point 102 then receives a timing signal from the access point 104 (and any other access points) at block 1208 and defines its timing based on the received timing signal(s) and the timing adjustment(s) at block 1210.

The access point 102 may perform operations such as those described above on a repeated basis to maintain current information regarding neighboring nodes (e.g., for location operations) and/or to maintain synchronization. For example, the access point 102 may conduct routine comprehensive searches for macro access points on a daily basis (e.g., at night or other times network traffic is low). In addition, or in the alternative, the network (e.g., the OAM&P) may instruct the access point 102 to conduct searches and/or resynchronize. In this way, the access point 102 may be aware of any changes in the macro system (e.g., a cell split, the installation of a new cell in the vicinity of the access point 102, and so on) that may affect the above operations.

It should be appreciated that the teachings herein may be implemented in various types of communication devices. In some aspects, the teachings herein may be implemented in wireless devices that may be deployed in multiple access communication system that may simultaneously support communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency range so that the reciprocity principle allows the estimation of the forward link channel from the reverse link channel. This enables the access point to extract transmit beam-forming gain on the forward link when multiple antennas are available at the access point.

Figure 13:
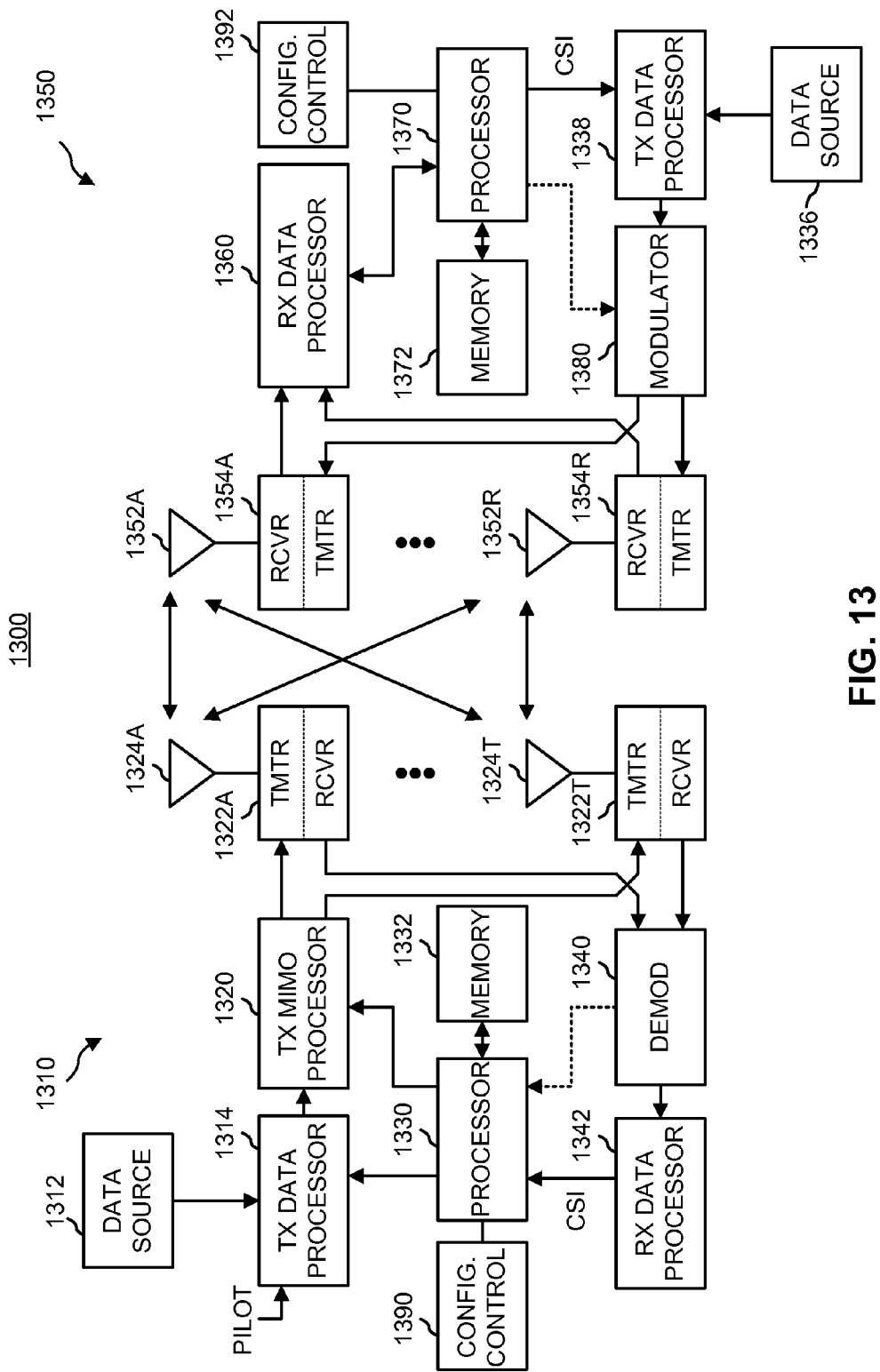
FIG. 13 is a simplified block diagram of several sample aspects of communication components.

The teachings herein may be incorporated into a node (e.g., a device) employing various components for communicating with at least one other node. FIG. 13 depicts several sample components that may be employed to facilitate communication between nodes. Specifically, FIG. 13 illustrates a wireless device 1310 (e.g., an access point) and a wireless device 1350 of a MIMO system 1300. At the device 1310, traffic data for a number of data streams is provided from a data source 1312 to a transmit ("TX") data processor 1314.

In some aspects, each data stream is transmitted over a respective transmit antenna. The TX data processor 1314 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1330. A data memory 1332 may store program code, data, and other information used by the processor 1330 or other components of the device 1310.

The modulation symbols for all data streams are then provided to a TX MIMO processor 1320, which may further process the modulation symbols (e.g., for OFDM). The TX MIMO processor 1320 then provides $N_T$ modulation symbol streams to $N_T$ transceivers ("XCVR") 1322A through 1322T. In some aspects, the TX MIMO processor 1320 applies beamforming weights to the symbols of the data streams and to the antenna from which the symbol is being transmitted.

Each transceiver 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1322A through 1322T are then transmitted from $N_T$ antennas 1324A through 1324T, respectively.

At the device 1350, the transmitted modulated signals are received by $N_R$ antennas 1352A through 1352R and the received signal from each antenna 1352 is provided to a respective transceiver ("XCVR") 1354A through 1354R. Each transceiver 1354 conditions (e.g., filters, amplifies, and downconverts) a respective received signal, digitizes the conditioned signal to provide samples, and further processes the samples to provide a corresponding "received" symbol stream.

A receive ("RX") data processor 1360 then receives and processes the $N_R$ received symbol streams from $N_R$ transceivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by the RX data processor 1360 is complementary to that performed by the TX MIMO processor 1320 and the TX data processor 1314 at the device 1310.

A processor 1370 periodically determines which pre-coding matrix to use (discussed below). The processor 1370 formulates a reverse link message comprising a matrix index portion and a rank value portion. A data memory 1372 may store program code, data, and other information used by the processor 1370 or other components of the device 1350.

The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by the transceivers 1354A through 1354R, and transmitted back to the device 1310.

At the device 1310, the modulated signals from the device 1350 are received by the antennas 1324, conditioned by the transceivers 1322, demodulated by a demodulator ("DEMOD") 1340, and processed by a RX data processor 1342 to extract the reverse link message transmitted by the device 1350. The processor 1330 then determines which pre-coding matrix to use for determining the beam-forming weights then processes the extracted message.

FIG. 13 also illustrates that the communication components may include one or more components that perform configuration (CONFIG.) control operations as taught herein. For example, a configuration control component 1390 may cooperate with the processor 1330 and/or other components of the device 1310 to send/receive signals to/from another device (e.g., device 1350) as taught herein. Similarly, a configuration control component 1392 may cooperate with the processor 1370 and/or other components of the device 1350 to send/receive signals to/from another device (e.g., device 1310). It should be appreciated that for each device 1310 and 1350 the functionality of two or more of the described components may be provided by a single component. For example, a single processing component may provide the functionality of the configuration control component 1390 and the processor 1330 and a single processing component may provide the functionality of the configuration control component 1392 and the processor 1370.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA")", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (IxRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

In some implementations, a node (e.g., a femto node) may be restricted in some way. For example, a given femto node may be configured to only provide certain services to certain access terminals. In deployments with so-called restricted (or closed) association, a given access terminal may only be served by the macro cell mobile network and a defined set of femto nodes (e.g., the femto nodes 410 that reside within the corresponding user residence 430 as shown in FIG. 4). For example, in FIG. 4 each femto node 410 may be configured to serve associated access terminals 420 (e.g., access terminal 420A) and, optionally, guest access terminals 420 (e.g., access terminal 420B). In other words, access to femto nodes 410 may be restricted whereby a given access terminal 420 may be served by a set of designated (e.g., home) femto node(s) 410 but may not be served by any non-designated femto nodes 410 (e.g., a neighbor's femto node 410).

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals. In some implementations, a node may be restricted to not provide, for at least one node, at least one of: signaling, data access, registration, paging, or service.

Various relationships may thus exist between a given femto node and a given access terminal. For example, from the perspective of an access terminal, an open femto node may refer to a femto node with open association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

Figure 14:
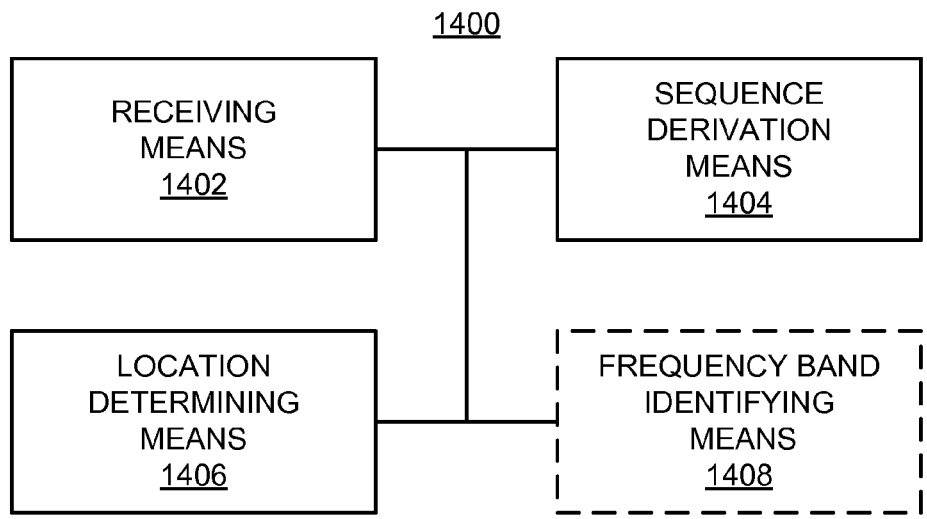
FIGS. 14-16 are simplified block diagrams of several sample aspects of apparatuses configured to facilitate an access point being configured based on signals received from one or more access points as taught herein.
Figure 15:
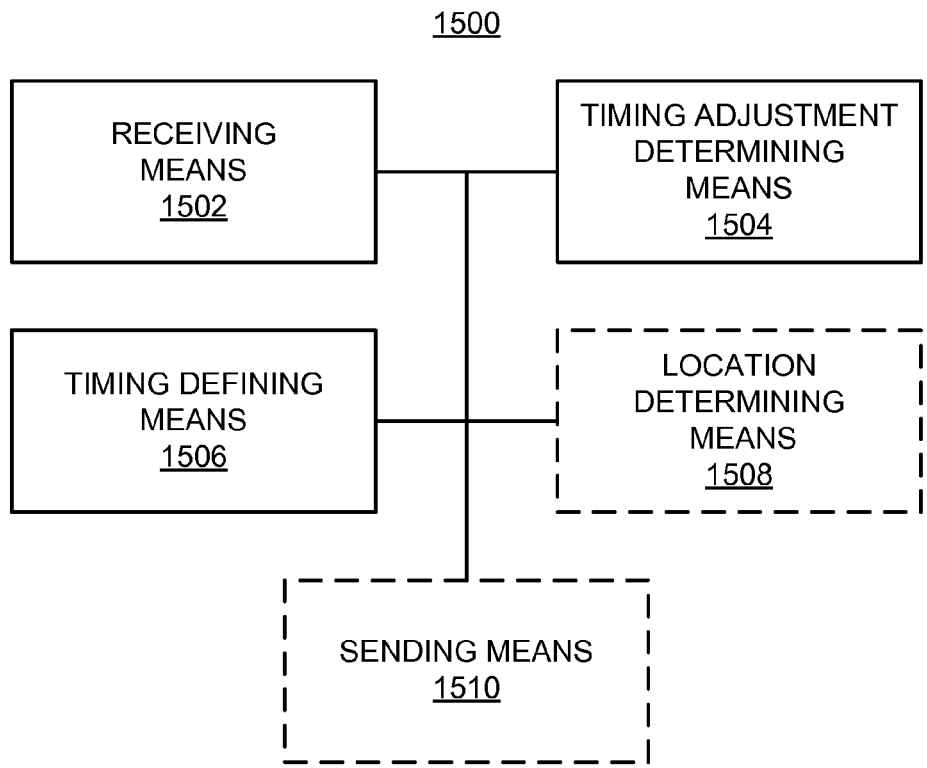
Figure 16:
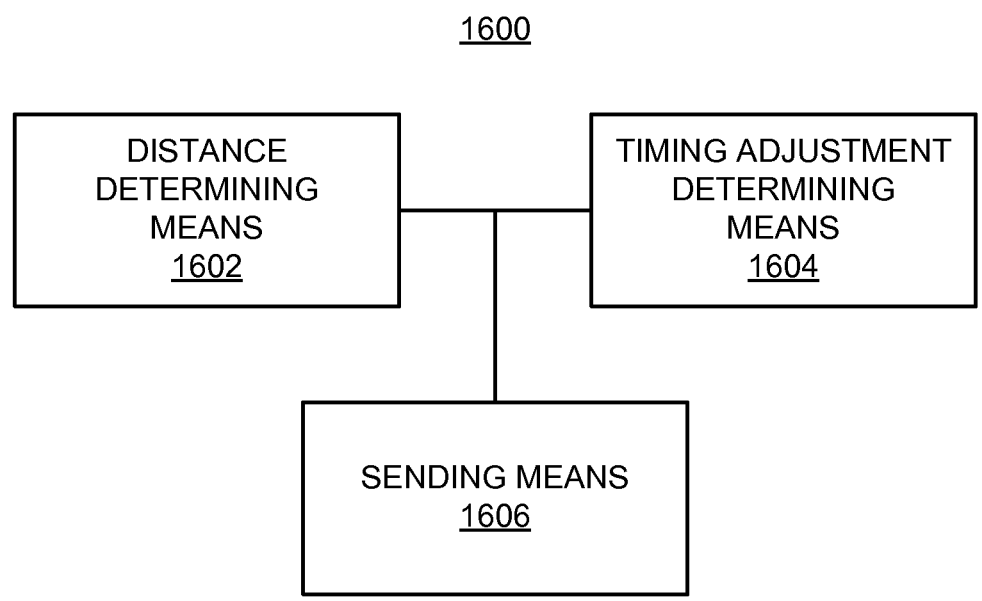

The components described herein may be implemented in a variety of ways. Referring to FIGS. 14-16, apparatuses 1400, 1500, and 1600 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 14-16 are optional.

The apparatuses 1400, 1500, and 1600 may include one or more modules that may perform one or more of the functions described above with regard to various figures. For example, a receiving means 1402 or 1502 may correspond to, for example, a receiver and/or a communication controller as discussed herein. A sequence derivation means 1404 may correspond to, for example, a sequence processor as discussed herein. A location determining means 1406 or 1508 may correspond to, for example, a location determiner as discussed herein. A frequency band identifying means 1408 may correspond to, for example, a frequency band identifier as discussed herein. A timing adjustment determining means 1504 or 1604 may correspond to, for example, a timing adjustment determiner as discussed herein. A timing defining means 1506 may correspond to, for example, a timing definer as discussed herein. A sending means 1510 or 1606 may correspond to, for example, a transmitter and/or a communication controller as discussed herein. A distance determining means 1602 may correspond to, for example, a distance determiner as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   identifying one or more frequency bands reserved for macro access points;
   receiving pilot signals from a plurality of macro access points at a first access point on the one or more identified frequency bands;
   storing at least one parameter associated with the received pilot signals at the first access point for use in a subsequent search for a pilot signal, wherein the at least one parameter comprises a monitored frequency band, and/or a detected reference signal, a physical identity, or combinations thereof;

deriving sequence information from the received pilot signals at the first access point, wherein the sequence information indicates different reference signals and/or physical identities associated with the plurality of macro access points and indicates timing associated with the receipt of the pilot signals from the plurality of macro access points;

receiving, from a network entity and at the first access point, location information indicative of locations of the plurality of macro access points;

determining at the first access point a location of the first access point based on the sequence information and the location information, and wherein the identifying the one or more frequency bands comprises receiving an indication of the one or more frequency bands from the network entity and wherein the indication of the frequency band is based on an address associated with a termination point of a fixed broadband connection to which the first access point is attached.

2. The method of claim 1, wherein the determining the location comprises:
sending from the first access point the sequence information to the network entity; and
receiving at the first access point an indication of the location from the network entity, wherein the indication is based on the sequence information.

3. The method of claim 1, wherein the determining the location comprises:
determining distances from the first access point to the plurality of macro access points; and
performing a triangulation operation.

4. The method of claim 1, wherein the deriving the sequence information comprises:
identifying reference signals and/or physical identities associated with the plurality of macro access points; and
determining timing associated with the receipt of the pilot signals from the plurality of macro access points.

5. The method of claim 1, wherein the identifying the one or more frequency bands comprises:
monitoring at least one supported frequency band; and
sending a message indicative of at least one signal received as a result of the monitoring of the at least one supported frequency band, wherein an indication of the one or more frequency bands is received in response to the message.

6. The method of claim 1, wherein the first access point comprises a femto node or a pico node.

7. The method of claim 1, wherein the indication of the frequency band is based on a customer address.

8. The method of claim 1, wherein the receiving the location information comprises:
reporting the received pilot signals to the network entity; and
receiving the location information from the network entity responsive to the reported pilot signals.

9. The method of claim 1, wherein femto nodes and pico nodes are not allowed to operate on frequency bands reserved for macro access points.

10. The method of claim 1, wherein the identifying the one or more frequency bands comprises maintaining a record of one or more frequency bands on which the first access point previously received pilot signals.

11. The method of claim 1, further comprising providing the determined location of the first access point as a location of an access terminal associated with the first access point.

12. The method of claim 1, wherein the receiving pilot signals comprises:
searching for the pilot signals over a period of time; and
integrating the pilot signals received over the period of time.

13. The method of claim 12, further comprising synchronizing the first access point to a strongest pilot signal found while searching for the pilot signals.

14. The method of claim 4, wherein the determining timing comprises determining relative timing that indicates a time delta between receipt of a signal from one macro access point and the receipt of a signal from another macro access point.

15. The method of claim 1, further comprising performing a consistency check of the determined location using the latitude and longitude of a household in which the first access point is installed.

16. The method of claim 1, further comprising:
sending an indication of the determined location to the network entity; and
receiving an indication of a timing adjustment.

17. The method of claim 1, further comprising:
determining a timing adjustment at the first access point based on a distance between the first access point and a second access point; and
receiving at the first access point a timing signal from the second access point; and
defining at the first access point timing based on the determined timing adjustment and the received timing signal.

18. An apparatus for communication, comprising: a frequency band identifier configured to identify one or more frequency bands reserved for macro access points;
a receiver configured to receive pilot signals from a plurality of macro access points at a first access point on the one or more identified frequency bands and to receive, from a network entity and at the first access point, location information indicative of locations of the plurality of macro access points;
a memory configured to store at least one parameter associated with received pilot signals at the first access point for use in a subsequent search for a pilot signal, wherein the at least one parameter comprises a monitored frequency band, and/or a detected reference signal, a physical identity, or combinations thereof;
a sequence processor configured to derive sequence information from the received pilot signals at the first access point, wherein the sequence information indicates different reference signals and/or physical identities associated with the plurality of macro access points and indicates timing associated with the receipt of the pilot signals from the plurality of macro access points;
a location determiner configured to determine at the first access point a location of the first access point based on the sequence information and the location information, and
wherein the identifying the one or more frequency bands comprises receiving an indication of the one or more frequency bands from the network entity and wherein the indication of the frequency band is based on an address associated with a termination point of a fixed broadband connection to which the first access point is attached.

19. The apparatus of claim 18, wherein the determining the location comprises:
sending from the first access point the sequence information to the network entity; and
receiving at the first access point an indication of the location from the network entity, wherein the indication is based on the sequence information.

20. The apparatus of claim 18, wherein the determining the location comprises:
determining distances from the first access point to the plurality of macro access points; and
performing a triangulation operation.

21. The apparatus of claim 18, wherein the deriving the sequence information comprises:
identifying reference signals and/or physical identities associated with the plurality of macro access points; and
determining timing associated with the receipt of the pilot signals from the plurality of macro access points.

22. The apparatus of claim 18, wherein the identifying the one or more frequency bands comprises:
monitoring at least one supported frequency band; and
sending a message indicative of at least one signal received as a result of the monitoring of the at least one supported frequency band, wherein an indication of the one or more frequency bands is received in response to the message.

23. An apparatus for communication, comprising: means for identifying one or more frequency bands reserved for macro access points; means for receiving pilot signals from a plurality of macro access points at a first access point on the one or more identified frequency bands;
means for storing at least one parameter associate with the received pilot signals at the first access point for use in a subsequent search for a pilot signal, wherein the at least one parameter comprises a monitored frequency band, and/or a detected reference signal, a physical identity, or combinations thereof;
means for deriving sequence information from the received pilot signals at the first access point, wherein the sequence information indicates different reference signals and/or physical identities associated with the plurality of macro access points and indicates timing associated with the receipt of the pilot signals from the plurality of macro access points;
means for receiving, from a network entity and at the first access point, location information indicative of locations of the plurality of macro access points;
means for determining at the first access point a location of the first access point based on the sequence information and the location information, and wherein the means for identifying the one or more frequency bands comprises means for receiving an indication of the one or more frequency bands from the network entity and wherein the indication of the frequency band is based on an address associated with a termination point of a fixed broadband connection to which the first access point is attached.

24. The apparatus of claim 23, wherein the means for determining the location comprises:
means for sending from the first access point the sequence information to the network entity; and
means for receiving at the first access point an indication of the location from the network entity, wherein the indication is based on the sequence information.

25. The apparatus of claim 23, wherein the means for determining the location comprises:
means for determining distances from the first access point to the plurality of macro access points; and
means for performing a triangulation operation.

26. The apparatus of claim 23, wherein the means for deriving the sequence information comprises:
means for identifying reference signals and/or physical identities associated with the plurality of macro access points; and
means for determining timing associated with the receipt of the pilot signals from the plurality of macro access points.

27. The apparatus of claim 23, wherein the means for identifying the one or more frequency bands comprises:
means for monitoring at least one supported frequency band; and
means for sending a message indicative of at least one signal received as a result of the monitoring of the at least one supported frequency band, wherein the means for receiving are configured for receiving an indication of the one or more frequency bands in response to the message.

28. A non-transitory computer-readable medium comprising codes for causing a computer to:
identify one or more frequency bands reserved for macro access points;
receive pilot signals from a plurality of macro access points at a first access point on the one or more identified frequency bands;
store at least one parameter associated with the received pilot signals at the first access point for use in a subsequent search for a pilot signal, wherein the at least one parameter comprises a monitored frequency band, and/or a detected reference signal, a physical identity, or combinations thereof;
derive sequence information from the received pilot signals at the first access point, wherein the sequence information indicates different reference signals and/or physical identities associated with the plurality of macro access points and indicates timing associated with the receipt of the pilot signals from the plurality of macro access points;
receive, from a network entity and at the first access point, location information indicative of locations of the plurality of macro access points;
determine at the first access point a location of the first access point based on the sequence information and the location information, and
wherein the identifying the one or more frequency bands comprises receiving an indication of the one or more frequency bands from the network entity and wherein the indication of the frequency band is based on an address associated with a termination point of a fixed broadband connection to which the first access point is attached.

29. The non-transitory computer-readable medium of claim 28, wherein the code for determining the location comprises code for causing the computer to:
send from the first access point the sequence information to the network entity; and
receive at the first access point an indication of the location from the network entity, wherein the indication is based on the sequence information.

* * * * *